United States Patent
Oikawa et al.

(10) Patent No.: US 10,952,417 B2
(45) Date of Patent: Mar. 23, 2021

(54) REEL LEG FIXING APPARATUS, METHOD OF FABRICATING THE REEL LEG FIXING APPARATUS, AND METHOD OF FABRICATING HOOD PORTION OF THE REEL LEG FIXING APPARATUS

(71) Applicant: Globeride, Inc., Tokyo (JP)

(72) Inventors: Katsuhiro Oikawa, Tokyo (JP); Hideyuki Naito, Tokyo (JP); Koichi Ito, Tokyo (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 15/622,904

(22) Filed: Jun. 14, 2017

(65) Prior Publication Data

US 2017/0280694 A1     Oct. 5, 2017

Related U.S. Application Data

(63) Continuation of application No. 14/662,917, filed on Mar. 19, 2015, now abandoned.

(30) Foreign Application Priority Data

| Mar. 26, 2014 | (JP) | JP2014-063122 |
| Mar. 31, 2014 | (JP) | JP2014-070774 |
| Mar. 31, 2014 | (JP) | JP2014-070775 |

(51) Int. Cl.
  *A01K 87/06* (2006.01)
  *B32B 5/12* (2006.01)
  (Continued)

(52) U.S. Cl.
  CPC ............ *A01K 87/06* (2013.01); *B29C 70/205* (2013.01); *B29C 70/22* (2013.01); *B29C 70/222* (2013.01);
  (Continued)

(58) Field of Classification Search
  CPC ..................................................... A01K 87/06
  (Continued)

(56) References Cited

U.S. PATENT DOCUMENTS

| 4,045,902 A | * | 9/1977 | Ohmura | A01K 87/06 |
| | | | | 43/22 |
| 5,600,915 A | * | 2/1997 | Ohmura | A01K 87/06 |
| | | | | 43/22 |

(Continued)

FOREIGN PATENT DOCUMENTS

| CN | 1788555 A | 6/2006 |
| CN | 101548663 A | 10/2009 |

(Continued)

OTHER PUBLICATIONS

Translation of JP 2014-011975 (Year: 2014).*

(Continued)

*Primary Examiner* — Darren W Ark
(74) *Attorney, Agent, or Firm* — DLA Piper LLP (US)

(57) ABSTRACT

One object is to provide a reel leg fixing apparatus including a hood portion having an efficiently reduced thickness and weight while maintaining a sufficient strength. Another object of the present invention is to provide a reel leg fixing apparatus including a hood portion having a reduced thickness and weight while efficiently ensuring necessary strength at relevant portions, and a method of fabricating the reel leg fixing apparatus. Still another object of the present invention is to provide a reel leg fixing apparatus including a hood portion having an oblique end that allows weight reduction and maintains a sufficient strength.

5 Claims, 25 Drawing Sheets

(51) Int. Cl.
　　*B32B 5/14*　　　(2006.01)
　　*B29C 70/22*　　(2006.01)
　　*B29C 70/32*　　(2006.01)
　　*B29C 70/20*　　(2006.01)

(52) U.S. Cl.
　　CPC .............. *B29C 70/32* (2013.01); *B32B 5/12* (2013.01); *B32B 5/14* (2013.01); *B29C 2793/009* (2013.01); *B29C 2793/0081* (2013.01)

(58) Field of Classification Search
　　USPC ............................................................ 43/22
　　See application file for complete search history.

(56) References Cited

U.S. PATENT DOCUMENTS

| | | | | |
|---|---|---|---|---|
| 6,105,301 A * | 8/2000 | Ohmura | ............... | A01K 87/06 43/22 |
| 6,438,890 B1 * | 8/2002 | Yamamoto | ............ | A01K 87/06 43/22 |
| 6,848,209 B2 * | 2/2005 | Ohmura | ............... | A01K 87/08 43/22 |
| 6,871,441 B1 * | 3/2005 | Tsurufuji | ............... | A01K 87/06 43/22 |
| 7,159,355 B2 * | 1/2007 | Muroi | .................... | A01K 87/06 43/22 |
| 9,635,842 B2 * | 5/2017 | Iwata | ..................... | A01K 87/08 |
| 2015/0181851 A1 * | 7/2015 | Akiba | .................... | A01K 87/06 43/22 |
| 2015/0181852 A1 * | 7/2015 | Akiba | .................... | A01K 87/06 43/18.5 |
| 2015/0272099 A1 * | 10/2015 | Oikawa | ................. | A01K 87/06 43/22 |
| 2016/0286773 A1 * | 10/2016 | Naito | ..................... | A01K 89/00 |

FOREIGN PATENT DOCUMENTS

| | | | |
|---|---|---|---|
| CN | 101897323 A | 12/2010 | |
| EP | 2888938 A1 * | 7/2015 | ............. A01K 87/06 |
| EP | 2888938 A1 | 7/2015 | |
| EP | 2888939 A1 | 7/2015 | |
| EP | 2888939 A1 * | 7/2015 | ............. A01K 87/06 |
| EP | 3075243 A1 * | 10/2016 | ............. A01K 87/06 |
| EP | 3075243 A1 | 10/2016 | |
| JP | S57-187064 | 5/1981 | |
| JP | 57187064 A * | 11/1982 | |
| JP | 61104733 A * | 5/1986 | |
| JP | 62198971 U * | 12/1987 | |
| JP | 63028365 U * | 2/1988 | |
| JP | 3-61030 A | 3/1991 | |
| JP | 06-060357 U | 8/1994 | |
| JP | 11155431 A * | 6/1999 | |
| JP | 11155431 A | 6/1999 | |
| JP | 11-215936 A | 8/1999 | |
| JP | 11266753 A * | 10/1999 | |
| JP | H11-266753 A | 10/1999 | |
| JP | 2002-027873 A | 1/2002 | |
| JP | 2002-233272 A | 8/2002 | |
| JP | 2003000780 A * | 1/2003 | |
| JP | 2005-151929 A | 6/2005 | |
| JP | 2006-333723 A | 12/2006 | |
| JP | 2007167015 A | 7/2007 | |
| JP | 2007167015 A * | 7/2007 | |
| JP | 2007202407 A | 8/2007 | |
| JP | 2007202407 A * | 8/2007 | |
| JP | 2007-244396 A | 9/2007 | |
| JP | 2009296989 A | 12/2009 | |
| JP | 2009296989 A * | 12/2009 | |
| JP | 2010172308 A * | 8/2010 | |
| JP | 2010172308 A | 8/2010 | |
| JP | 2010273586 A | 12/2010 | |
| JP | 2010273586 A * | 12/2010 | |
| JP | 2011010592 A * | 1/2011 | |
| JP | 2011067123 A | 4/2011 | |
| JP | 2011067123 A * | 4/2011 | |
| JP | 2012029609 A * | 2/2012 | |
| JP | 2012029609 A | 2/2012 | |
| JP | 4979489 B2 | 7/2012 | |
| JP | 2013-146216 A | 8/2013 | |
| JP | 2013-146218 A | 8/2013 | |
| JP | 2014-011975 A | 1/2014 | |
| JP | 2014011975 A * | 1/2014 | |
| JP | 2014011976 A | 1/2014 | |
| JP | 2014011976 A * | 1/2014 | |
| JP | 6017864 B2 | 11/2016 | |
| JP | 6017864 B2 * | 11/2016 | |
| JP | 2016192954 A * | 11/2016 | |
| JP | 6121937 B2 * | 4/2017 | |

OTHER PUBLICATIONS

Chinese Office Action dated Jan. 22, 2017 for Appln. No. 201510130456.4.
Extended European Search Report dated Jan. 11, 2016 for Appln. No. 15159672.3.
Partial European Search Report dated Sep. 16, 2015 for European Patent Appln. No. 15159672.3.
Translation of JP2014-11975.
Translation of JP11-266753.
Non-Final Office Action Japanese Patent Application No. 2014-063122 dated Apr. 20, 2017 with English translation.
Notification of Reasons for Refusal Korean Patent Application No. 10-2015-0041747 dated Mar. 28, 2018 with English translation.
Non-Final Office Action Korean Patent Application No. 10-2015-0041747 dated Aug. 31, 2017 with full English translation.
The First Office Action dated Dec. 12, 2019, of counterpart Chinese Application No. 201710422181.0, along with an English translation.
The First Office Action dated Nov. 15, 2019, of counterpart Chinese Application No. 201710422182.5, along with an English translation.
The Second Office Action dated Jul. 21, 2020, of counterpart Chinese Application No. 201710422182.5, along with an English translation.

* cited by examiner

REEL LEG FIXING APPARATUS, METHOD OF FABRICATING THE REEL LEG FIXING APPARATUS, AND METHOD OF FABRICATING HOOD PORTION OF THE REEL LEG FIXING APPARATUS

CROSS-REFERENCE TO RELATED APPLICATIONS

This application is a continuation of U.S. patent application Ser. No. 14/662,917, filed on Mar. 19, 2015, which is based on and claims the benefit of priority from Japanese Patent Application Serial Nos. 2014-70774 (filed on Mar. 31, 2014), 2014-70775 (filed on Mar. 31, 2014), and 2014-63122 (filed on Mar. 26, 2014), the contents of which are hereby incorporated by reference in their entirety.

TECHNICAL FIELD

The present invention relates to a reel leg fixing apparatus which is to be mounted on a fishing rod and allows various fishing reels to be mounted thereon, a method of fabricating the same, and a method of fabricating a hood portion used in such a reel leg fixing apparatus.

BACKGROUND

As disclosed in Japanese Utility Model Application Publication No. S57-187064 for example, there is a conventionally known reel leg fixing apparatus including a movable hood and a fixed hood separated in the axial direction, wherein one end of a reel leg is inserted in the fixed hood and the other end of the reel leg is pressed down by the movable hood which is movable in an axial direction, such that a fishing reel is fixed. The fixed hood and the movable hood are disposed on a pipe-shaped reel seat attached to the outer circumference of a base rod. An operation nut placed adjacent to the movable hood can be rotated to move the movable hood toward or away from the fixed hood, thereby to attach or detach a fishing reel. The movable hood and the fixed hood (hereinafter also referred to collectively as "the hood portion") of the reel leg fixing apparatus described above are usually formed of a metal material, and a pad portion formed of a synthetic resin is disposed on the portion contacted by the reel leg inserted (an inner surface of the hood portion). There has recently been a demand for weight reduction of a fishing rod. The hood portion formed of a metal material constitutes an obstacle to weight reduction. Therefore, Japanese Patent Application Publication No. 2014-11975 (the "'975 Publication") for example discloses that a plurality of prepreg sheets formed of reinforcement fibers impregnated with a synthetic resin are stacked together and shaped into a tubular shape to form a hood portion. Also, the '975 Publication discloses that the plurality of prepreg sheets are stacked together to form the hood portion such that the portion where the prepreg sheets overlap with one another is positioned at a region other than the leg retainer of the reel leg to prevent reduction in strength.

The weight of the above hood portion can be reduced by forming the hood portion of a fiber reinforced resin material. For weight reduction of the fishing rod, the fishing rod should preferably have as small a thickness as possible. That is, the hood portion having a small thickness contributes weight reduction of the reel leg fixing apparatus and reduces the heights of steps between the reel leg fixing apparatus and the reel leg and between the reel leg fixing apparatus and the reel seat body, thereby improving the grip feeling.

The '975 Publication merely discloses that a plurality of prepreg sheets having different specifications are stacked together such that the overlapping portion is not positioned at the leg retainer, but does not disclose that the hood portion has as small a thickness as possible for weight reduction while maintaining its strength. Therefore, the hood portion of the '975 Publication includes an unnecessary prepreg sheet for unnecessary reinforcement that increases the thickness of the hood portion and inhibits sufficient weight reduction. Although reinforcement against twisting is necessary near an opening in the hood portion into which an end of the reel leg is inserted, the '975 Publication does not disclose efficient implementation of such reinforcement combined with reduction in the thickness. Therefore, the hood portion of the '975 Publication includes an unnecessary prepreg sheet for unnecessary reinforcement that increases the thickness of the hood portion and inhibits sufficient weight reduction.

Also, the '975 Publication discloses that the prepreg sheets rolled around a mandrel have a notch at a predetermined position so as to prevent a wrinkle, but a notch in a prepreg sheet cuts reinforcement fibers and causes reduction in strength and breakage.

Further, there is a demand that the above hood portion should have good appearance design as well as a small weight. The hood portion has a tubular shape including a protrusion on the side where the reel leg is placed, so as to receive the reel leg. The portions below both sides of the protrusion are cut obliquely to reduce the weight and improve the design (hereinafter such cut portions are also referred to as oblique ends).

As disclosed in the '975 Publication above, it is known to form the hood portion of a fiber reinforced resin material for weight reduction; but such a hood portion loses strength when having oblique ends. That is, when the hood portion is formed of a fiber reinforced resin material, prepreg sheets including reinforcement fibers impregnated with a synthetic resin are rolled around a mandrel having a predetermined shape to fabricate a tube, as disclosed in the '975 Publication. In forming oblique ends in such a tube, it is necessary to cut the end surface of the tube obliquely.

However, when the tube formed of the fiber reinforced resin material (the shaped hood portion) is cut obliquely at its end, the reinforcement fibers in the cut surface are cut. Thus, in the arrangement where the rolled prepreg sheets include reinforcement fibers oriented in the circumferential direction in the protrusion for receiving a reel leg, forming of the oblique ends causes the reinforcement fibers oriented in the circumferential direction to be cut, failing to maintain a desired strength and causing flaking or cracking among the cut reinforcement fibers.

SUMMARY

The present invention is intended to overcome the above problems, and one object thereof is to provide a reel leg fixing apparatus including a hood portion having an efficiently reduced thickness and weight while maintaining sufficient strength. Another object of the present invention is to provide a reel leg fixing apparatus including a hood portion having a reduced thickness and weight while efficiently ensuring necessary strength at relevant portions, and a method of fabricating the reel leg fixing apparatus. Still another object of the present invention is to provide a reel leg fixing apparatus including a hood portion having a reduced weight and sufficient strength and having oblique ends, and a method of fabricating the reel leg fixing apparatus.

To the above end, a reel leg fixing apparatus according to the present invention comprises: a hood portion having a tubular shape and having an opening for receiving a reel leg of a fishing reel, wherein the hood portion is formed of a plurality of prepreg sheets stacked together and is configured to be moved in an axial direction by an operation nut, and wherein the hood portion includes a higher proportion of reinforcement fibers oriented in a circumferential direction in a portion adjacent to the opening than in a portion adjacent to the operation nut.

The reel leg fixing apparatus described above may have a light weight since the hood portion having a tubular shape is formed of a plurality of prepreg sheets stacked together. In inserting and fixing the reel leg, the hood portion may be subjected to a load to expand the opening region along the circumferential direction; but the opening region will not be broken since the proportion of the reinforcement fibers oriented in the circumferential direction is higher in the opening region than in the portion adjacent to the operation nut, enabling efficient reinforcement. That is, since the hood portion as a whole does not include any unnecessary prepreg sheet and is efficiently reinforced, the hood portion can be reduced in thickness and weight.

To the above end, a reel leg fixing apparatus according to the present invention comprises: a hood portion having a tubular shape and including a protrusion protruding so as to have an opening for receiving a reel leg of a fishing reel, wherein the hood portion is formed of a plurality of prepreg sheets stacked together and is configured to be moved in an axial direction by an operation nut, and wherein the hood portion includes reinforcement fibers oriented at least in the axial direction and extending continuously across an entire length of the hood portion, and the protrusion includes a region where the reinforcement fibers oriented in the axial direction are oblique to the axial direction.

With the above arrangement, a plurality of prepreg sheets may be stacked together to form the hood portion having a tubular shape, thereby reducing the weight. The hood portion may include the reinforcement fibers oriented at least in the axial direction and extending continuously across the entire length of the hood portion 215A, preventing reduction in strength and breakage. Further, the hood portion may include a region in the protrusion where the reinforcement fibers oriented in the axial direction are oblique with respect to the axial direction, Therefore, the region may have a high strength against twisting because of the obliqueness of the fibers.

The region may be disposed at a desired position in the protrusion of the hood portion continuously (to, e.g., the opening of the hood portion) or separately; but as described later, the region should preferably be disposed symmetrically on both left and right sides of the hood portion particularly in the outer layer of the hood portion so as to effectively and efficiently ensure the torsional strength. Particularly when the region is disposed near the opening of the hood portion that tends to be subjected to a large torsional force, twisting can be securely and effectively suppressed at this portion.

Since an appropriate part of the continuous axial fibers are oriented obliquely so as to ensure torsional strength, the hood portion as a whole can be efficiently reinforced without having unnecessary prepreg sheets, resulting in a reduced thickness and weight of the entire hood portion.

The present invention also provides methods of fabricating a hood portion as described above.

To the above end, a reel leg fixing apparatus according to the present invention comprises: a hood portion having a tubular shape and having an opening for receiving a reel leg of a fishing reel, wherein the hood portion is formed of a fiber reinforced resin material, and wherein the hood portion has an oblique end extending from an opening region through which the reel leg is to be inserted, to an opposite region along surfaces of both sides so as to be oblique with respect to an axial direction, and the fiber reinforced resin material includes an oblique fiber layer including reinforcement fibers oriented along the oblique end.

The reel leg fixing apparatus described above may have a light weight since the hood portion having a tubular shape is formed of a fiber reinforced resin material. The hood portion has an oblique end extending from an opening region through which the reel leg is to be inserted, to an opposite region along surfaces of both sides so as to be oblique with respect to an axial direction. Since the reinforcement fibers in the oblique end are oriented along the oblique end, the reinforcement fibers arranged along the circumferential direction are not cut, thus maintaining a desired strength. Additionally, since the reinforcement fibers are not cut, flaking and cracking can be prevented.

One object of the present invention is to provide a method of fabricating the hood portion of a reel leg fixing apparatus as described above, comprising the step of: forming the oblique fiber layer by rolling around a mandrel a fiber reinforced resin tape released from a bobbin, the mandrel having a surface shape conforming to the shape of the hood portion, the fiber reinforced resin tape including the reinforcement fibers arranged regularly in one orientation, wherein in forming the oblique fiber layer, the fiber reinforced resin tape released from the bobbin is controlled to be oblique with respect to an axial direction of the mandrel.

One object of the present invention is to provide a method of fabricating the hood portion of a reel leg fixing apparatus as described above, comprising the step of: rolling two prepreg sheets on the mandrel to form the oblique fiber layer, wherein the mandrel has a surface shape conforming to the shape of the hood portion, the two prepreg sheets include the reinforcement fibers arranged regularly and oriented along the oblique end, and one of the two prepreg sheets is rolled on one side of the mandrel to form a half ply and the other is rolled on the other side to form a half ply, the two sides being divided at a top line of the opening.

One object of the present invention is to provide a method of fabricating the hood portion of a reel leg fixing apparatus as described above, comprising the step of: rolling a prepreg sheet on a mandrel having a surface shape conforming to the shape of the hood portion, the prepreg sheet including the reinforcement fibers woven obliquely with respect to the axial direction of the mandrel, wherein the oblique end of the oblique fiber layer is formed by cutting the woven prepreg sheet obliquely along the orientation of the reinforcement fibers.

The present invention provides a reel leg fixing apparatus including a hood portion having an efficiently reduced thickness and weight while maintaining a sufficient strength. The present invention also provides a reel leg fixing apparatus including a hood portion having a reduced thickness and weight while efficiently ensuring necessary strength at relevant portions. Further, the present invention also provides a reel leg fixing apparatus including a hood portion having a reduced weight while maintaining a sufficient strength, and makes it possible to readily fabricate such a hood portion.

BRIEF DESCRIPTION OF THE DRAWINGS

FIG. 8 shows an exemplary arrangement of prepreg sheets forming the movable hood shown in FIG. 7a.

FIG. 16b is a plane view of the prepreg sheet shown in FIG. 16a.

FIGS. 23a to 23b show rolling of a fiber reinforced resin tape around the mandrel shown in FIG. 22, wherein FIG. 22a shows the state of a bobbin at a rolling start position and FIG. 22b shows the state of the bobbin during rolling of the fiber reinforced resin tape on the oblique end side.

DESCRIPTION OF EXAMPLE EMBODIMENTS

Figure 1:
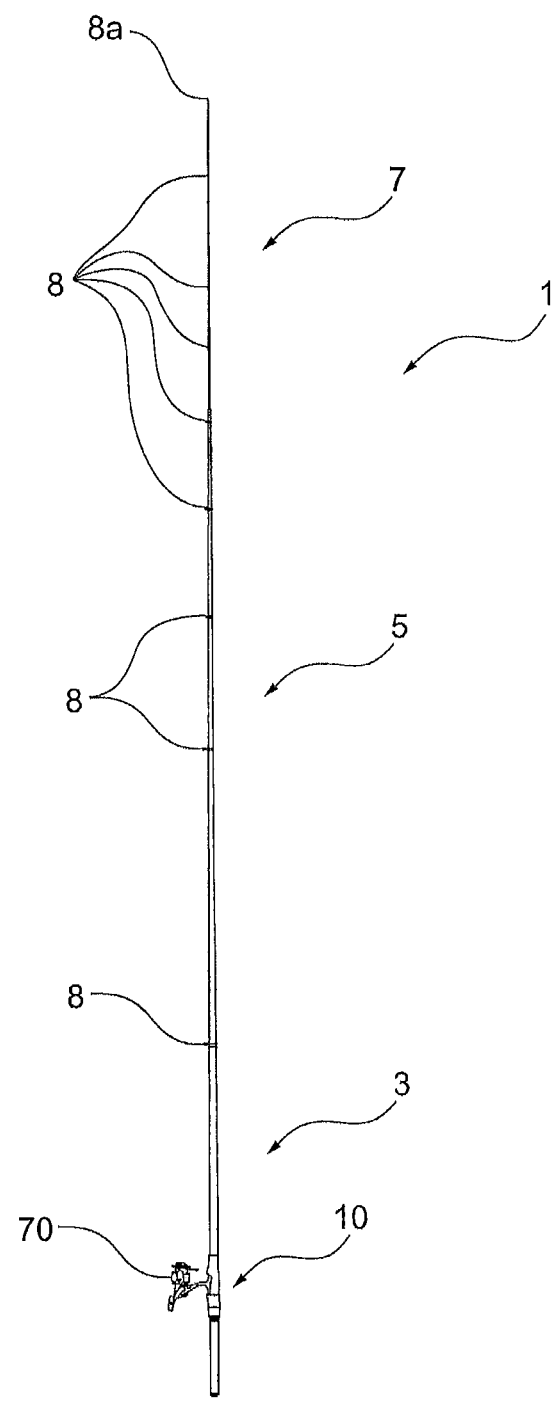
FIG. 1 shows an example of a fishing rod having a reel leg fixing apparatus mounted thereon.

FIG. 1 shows an example of a fishing rod having a reel leg fixing apparatus mounted thereon according to the present invention. The fishing rod 1 may include a plurality of rods jointed together. In the embodiment, the fishing rod 1 may include a base rod 3, an intermediate rod 5, and a tip rod 7; and these three rods may be ordinarily jointed together. The fishing rod 1 may either include no intermediate rod 5 or include two or more intermediate rods jointed together. The type of the fishing rod 1 is not limited but may be a single-rod type, a telescopic type, a drilled-bullet type, as well as the ordinarily jointed type.

On the base rod 3 may be provided a reel leg fixing apparatus 10 on which a fishing reel 70 is to be mounted; and a plurality of line guides 8 may be mounted on each of the rods at regular intervals for guiding the fishing line released from the fishing reel (the line guide provided at the tip end of the tip rod 7 may be a top guide 8a). The line guides 8 may be configured as either fixed guides fixed on the rods or free guides slidable along the rods.

The base rod 3, the intermediate rod 5, and the tip rod 7 may be formed of a fiber reinforced rein material including reinforcement fibers (such as carbon fibers or glass fibers) impregnated with a synthetic resin such as epoxy resin; and these rods may be either tubular or solid.

The reel leg fixing apparatus 10 provided on the base rod 3 may include a fixed hood and a movable hood movable in the axial direction. A fishing reel can be attached to and detached from the reel leg fixing apparatus 10 by moving the movable hood in the axial direction while the reel leg of the fishing reel is inserted into the fixed hood. The fixed hood can be positioned on either the tip side or the butt end side.

Figure 2:
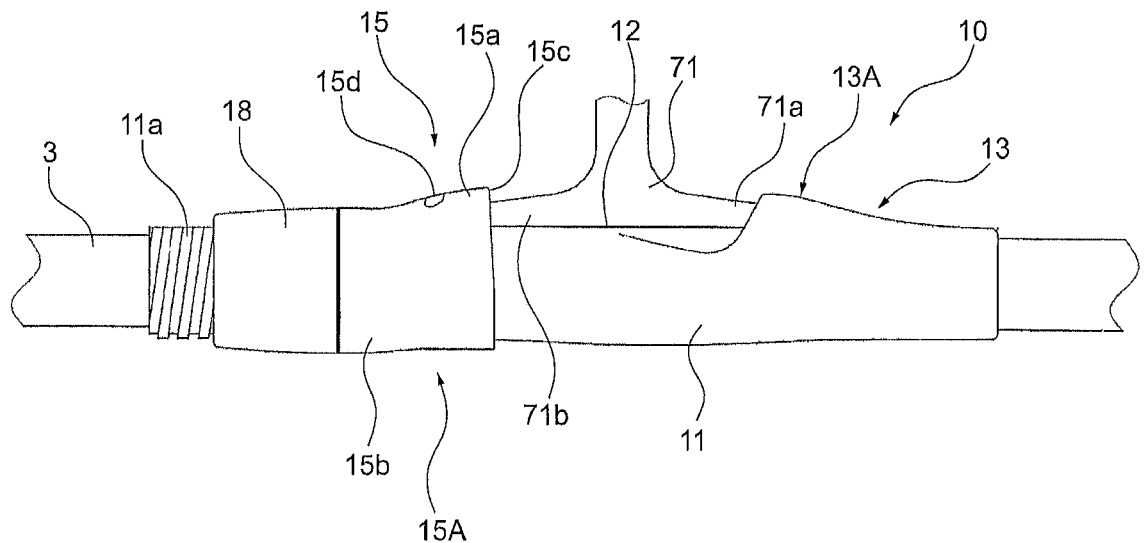
FIG. 2 shows an embodiment of a reel leg fixing apparatus according to the present invention.
Figure 3:
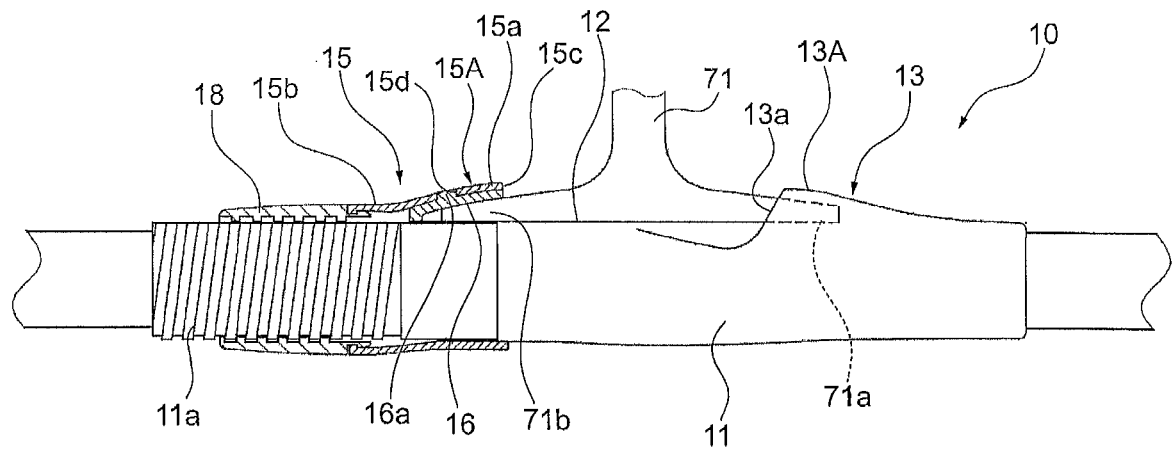
FIG. 3 is a partially sectional view of the reel leg fixing apparatus shown in FIG. 2, showing the arrangement of the movable hood.
Figure 4A:
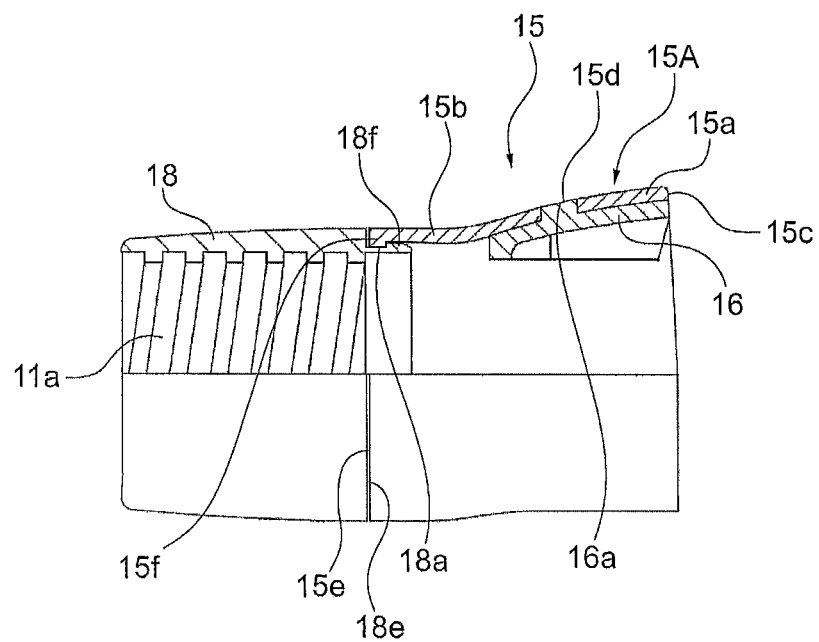
FIG. 4a is an enlarged view of a main part of the reel leg fixing apparatus shown in FIG. 3.
Figure 4B:
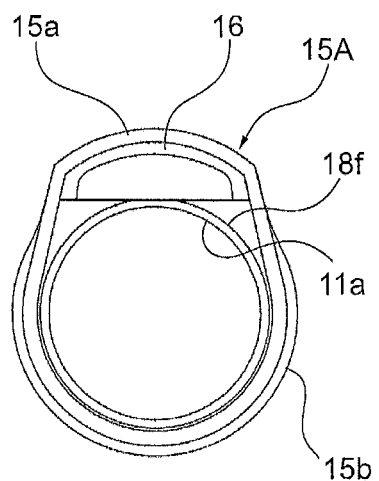
FIG. 4b shows the movable hood shown in FIG. 4a as viewed from the opening.
Figure 5:
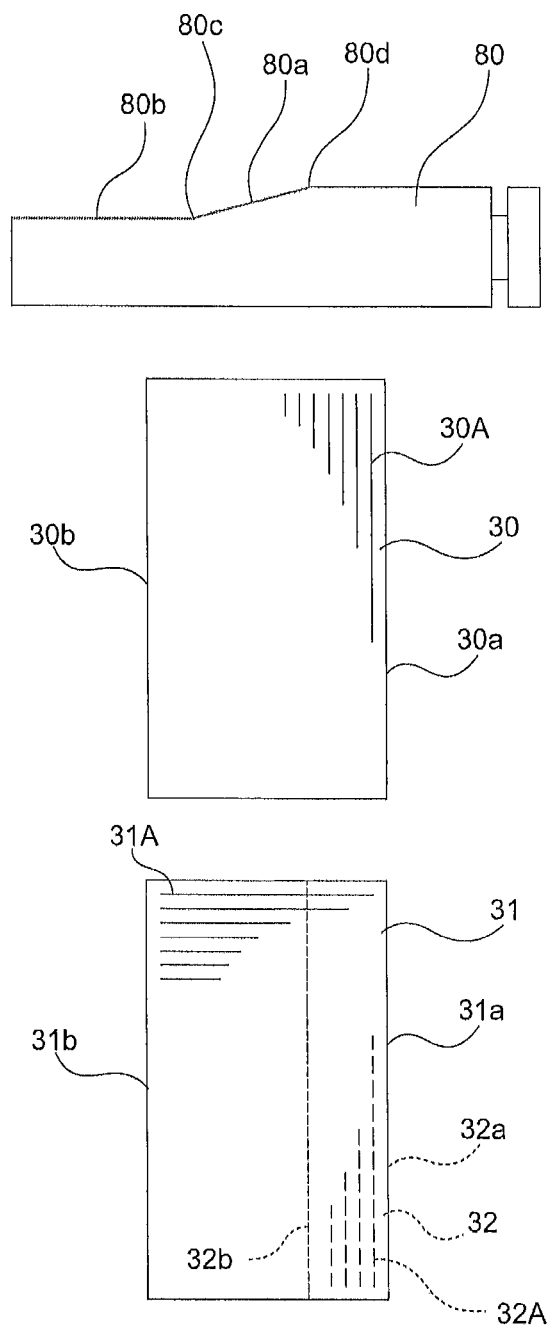
FIG. 5 shows an exemplary arrangement of prepreg sheets forming the movable hood.
Figure 6:
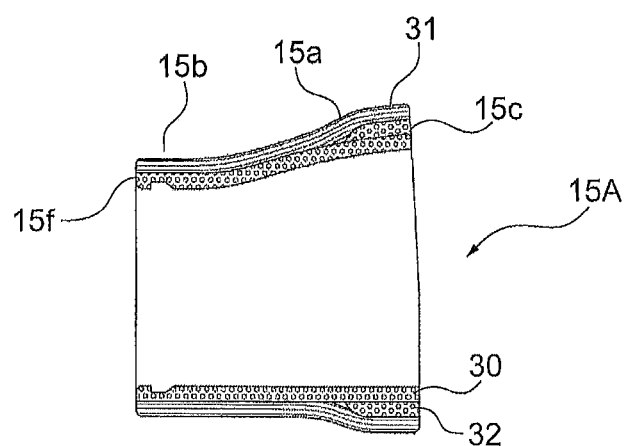
FIG. 6 is a sectional view showing an arrangement of the movable hood formed of the prepreg sheets shown in FIG. 5.

The reel leg fixing apparatus in one or more embodiments of the present invention will be described below with reference to FIGS. 2 to 6. FIG. 2 is a side view of the reel leg fixing apparatus; FIG. 3 is a partially sectional view of the reel leg fixing apparatus shown in FIG. 2, showing the arrangement of the movable hood; FIG. 4a is an enlarged view of a main part of the reel leg fixing apparatus shown in FIG. 3; and FIG. 4b shows the movable hood shown in FIG. 4a as viewed from the opening; FIG. 5 shows an exemplary arrangement of prepreg sheets forming the movable hood; and FIG. 6 is a sectional view showing an arrangement of the movable hood formed of the prepreg sheets shown in FIG. 5.

The reel leg fixing apparatus 10 may include a reel seat body (hereinafter referred to as "body") 11 shaped in a tube to be fitted around the base rod 3. The body 11 may be integrally formed of a synthetic resin and include a placement surface 12 on which the reel leg 71 of the fishing reel 70 may be placed, a fixed hood 13 disposed adjacent to the placement surface 12 on the tip side, and a movable hood 15 disposed adjacent to the placement surface 12 on the butt end side.

The fixed hood 13 may be formed integrally with the body 11 and include a hood portion 13A protruding so as to receive a tip-side leg portion 71a of the reel leg 71 which is to be inserted through an opening 13a in the hood portion 13A. It may also be possible that the hood portion 13A is formed separately from the body 11 and then integrated with the body 11, as may be for the hood portion of the movable hood (described later).

The movable hood 15 may be movable along the axial direction and include a hood portion 15A formed separately from the body 11. The hood portion 15A of the embodiment may include a protrusion 15a protruding so as to be capable of receiving a butt end-side leg portion 71b of the reel leg 71, and a cylindrical portion 15b formed integrally on the butt end side of the protrusion 15a. That is, the protrusion 15a may be shaped such that an arcuate area in a certain region of the outer circumference of the cylindrical portion 15b gradually rises toward the tip; and the butt end-side leg portion 71b of the reel leg 71 may be inserted through the opening 15c in the protrusion 15a.

Inside the protrusion 15a may be disposed a pad member 16 so as to be pressed by the surface of the butt end-side leg portion 71b of the reel leg 71 inserted. When the movable hood 15 is moved toward the fixed hood, the pad member 16 may be pressed against the surface of the butt end-side leg portion 71b of the reel leg 71 so as to securely fix the reel leg. The pad member 16 may be shaped so as to conform to the surface of the butt end-side leg portion 71b of the reel leg 71. When a projection 16a is fitted in a hole 15d formed in the protrusion 15a of the movable hood 15, the pad member 16 may be integrated with the inner surface of the protrusion 15a.

In the butt end-side of the body 11 may be integrally formed an external thread 11a, On the external thread 11a may be screwed an operation nut 18 which may be rotated to move along the axial direction. The operation nut 18 may be engaged at the front end thereof with the hood portion 15A (the cylindrical portion 15b) of the movable hood 15. In this engagement, the operation nut 18 rotated in the direction to tighten it may be moved toward the fixed hood without rotation of the movable hood 15, and the operation nut 18 rotated in the direction to loosen it may be moved away from the fixed hood without rotation of the movable hood 15.

More specifically, as shown in FIG. 4a, an annular projection 18a may be formed on an end edge 18e of the operation nut 18 facing the cylindrical portion 15b; an locking projection 18f projecting radially outward may be formed in the tip end of the annular projection 18a; and an locking projection 15f projecting radially inward may be formed in an end edge 15e of the cylindrical portion 15b facing the operation nut 18. The locking projection 18f and the locking projection 15f may be locked on each other.

With such an engagement between the operation nut 18 and the hood portion 15A (the cylindrical portion 15b), the operation nut 18 rotated in the direction to tighten it may be screwed toward the fixed hood while the hood portion 15A (the cylindrical portion 15b) is moved toward the fixed hood without rotation since the end edge 18e contacts the end edge 15e. Thus, the reel leg 71 placed on the placement surface 12 may be tightly fixed by the pair of hood portions (the fixed hood 13A and the movable hood 15A). The operation nut 18 rotated in the direction to loosen it may be screwed away from the fixed hood while the hood portion 15A (the cylindrical portion 15b) is moved away from the fixed hood without rotation since the locking projection 15f is engaged with the locking projection 18f. Thus, the reel leg 71 placed on the placement surface 12 can be detached from the pair of hood portions (the fixed hood 13A and the movable hood 15A).

The hood portion 15A of the movable hood 15 may be formed of a fiber reinforced resin material so as to reduce the weight while maintaining the strength at a certain level. More specifically, the hood portion 15A may be formed of a plurality of prepreg sheets having different specifications stacked together into a tubular shape. Each of the prepreg sheets may include reinforcement fibers such as carbon fibers, glass fibers, or aramid fibers arranged regularly in a certain orientation or woven, and the reinforcement fibers may be impregnated with a thermoplastic resin (such as Nylon, polypropylene, polyphenyl sulfide, or thermoplastic polyurethane) or a thermosetting resin (such as epoxy resin, phenol resin, or polyester resin) as a matrix resin. The arrangement of the hood portion 15A will be described in detail below.

When the hood portion 15A fixes the reel leg 71 tightly, the portion around the opening 15c may be subjected to a force to expand the opening imparted from the surface of the butt end side leg portion 71b of the reel leg 71 abutting thereon. On the opening side of the protrusion 15a, particularly in the edge region of the opening 15c, the reinforcement fibers may be arranged regularly in the axial direction (of the base rod 3); therefore, cracking may tend to occur in the axial direction and reduce the strength. Thus, the opening region may include prepreg sheets having reinforcement fibers oriented in the circumferential direction so as to resist the load to expand the opening, as will be described later.

When the hood portion 15A fixes the reel leg tightly, the region of the protrusion 15a of the hood portion 15A other than the opening region may be subjected to only a small amount of load imparted in the direction to expand the opening, but may be subjected to a bending force along the axial direction. Thus, the region from the opening region to the cylindrical portion 15b may include prepreg sheets having reinforcement fibers oriented in the axial direction so as to resist mainly the bending load, as will be described later.

FIG. 5 shows an exemplary arrangement of prepreg sheets to resist the loads imparted on the hood portion 15A as described above. The hood portion 15A may be formed by rolling, on a mandrel 80 having a predetermined shape, a plurality of prepreg sheets 30 to 32 having different specifications, heating the prepreg sheets to cure the synthetic resin, and then pulling out the mandrel 80.

On the surface of the mandrel 80 may be formed a protrusion 80a and a cylindrical portion 80b so as to conform to the shape of the hood portion 15A. That is, the cylindrical portion 80b may have a circular section and may be included in the cylindrical portion 15b of the hood portion 15A. The protrusion 80a may have a slope gradually rising forward from a circumferential part of the end 80c of the cylindrical portion 80b (a predetermined arcuate range corresponding to the reel leg to be inserted) (the slope end 80d may correspond to the opening 15c of the protrusion 15a of the hood portion 15A); and the slope may be included in the protrusion 15a of the hood portion 15A.

In the embodiment, the hood portion 15A may be formed by rolling on the mandrel 80 prepreg sheets (body prepreg sheets, or body layers) 30, 31 disposed across the axial length of the hood portion 15A and a prepreg sheet (reinforcement prepreg sheet, or reinforcement layer) 32 for reinforcing the opening region of the hood portion 15A.

In the inner layer of the hood portion 15A, the prepreg sheet 30 including the reinforcement fibers 30A arranged regularly in the circumferential direction may be rolled to extend in the axial direction and constitute a circumferential fiber layer 30 (in FIG. 6, the prepreg sheet and the fiber layer are denoted by the same reference numeral). The prepreg sheet 30 may be rolled such that the rear end edge 30b thereof is aligned with a portion in the cylindrical portion 80b of the mandrel, and the front end edge 30a thereof is aligned with the slope end 80d of the protrusion 80a of the mandrel. As a result, the reinforcement fibers oriented in the circumferential direction may be continuous in the circumferential direction and may not be cut. The front end edge 30a of the prepreg sheet 30 may be positioned slightly ahead of the slope end 80d of the mandrel and may be cut off after the heat curing.

Outside the prepreg sheet 30 rolled as above may be rolled the prepreg sheet 31 including the reinforcement fibers 31A arranged regularly in the axial direction, constituting the axial fiber layer 31. The prepreg sheet 31 may be rolled such that the rear end edge 31b and the front end edge 31a thereof are aligned with the rear end edge 30b and the front end edge 30a of the prepreg sheet 30, respectively. As a result, the reinforcement fibers oriented in the axial direction may also be continuous in the axial direction and may not be cut.

Further, inside the prepreg sheet 31 (outside the prepreg sheet 30) may be rolled the reinforcement prepreg sheet 32 including the reinforcement fibers 32A arranged regularly in the circumferential direction. The prepreg sheet 32 may be rolled such that the rear end edge 32b thereof is aligned with a middle portion of the protrusion 80a of the mandrel, and the front end edge 32a thereof is aligned with the front end edge 30a of the prepreg sheet 30 and the front end edge 31a of the prepreg sheet 31. The reinforcement prepreg sheet 32 may be either rolled on the prepreg sheet 30 after the prepreg sheet 30 is rolled, or attached previously on the surface of the prepreg sheet 30. Alternatively, the prepreg sheet 30 may be previously attached on the bottom of the prepreg sheet 31.

The hood portion 15A formed of the prepreg sheets 30 to 32 rolled are viewed sectionally along the axial direction in FIG. 6. That is, the prepreg sheet 30 disposed in the inner layer may constitute the circumferential fiber layer 30 extending in the axial direction and including reinforcement fibers arranged in the circumferential direction. The reinforcement prepreg sheet 32 outside the circumferential fiber layer 30 may constitute the circumferential fiber layer 32 positioned adjacent to the opening 15c and including the reinforcement fibers arranged regularly in the circumferential direction. That is, the proportion of the reinforcement fibers oriented in the circumferential direction may be higher in the portion of the protrusion 18a adjacent to the opening 15c than in the portion adjacent to the operation nut 18. Further, outside the circumferential fiber layers 30, 32 may be the axial fiber layer 31 extending in the axial direction and including the reinforcement fibers arranged in the axial direction.

In the hood portion 15A formed of the prepreg sheets 30 to 32 described above, the portion of the protrusion 15a adjacent to the opening 15c may be thicker than the cylindrical portion 15b by the thickness of the reinforcement prepreg sheet 32. Further, a circumferential groove may be formed in the end of the cylindrical portion 15b to form the locking projection 15f.

The reel leg fixing apparatus including the hood portion 15A described above may have a light weight since the hood portion 15A having a tubular shape is formed of the prepreg sheets 30 to 32 stacked together. In fixing the reel leg 71, the hood portion 15A may be subjected to a load to expand the opening region along the circumferential direction; but the opening region will not be broken since the proportion of the reinforcement fibers oriented in the circumferential direction is higher in the opening region than in the portion adjacent to the operation nut 18. Thus, since the portion having a low strength is effectively reinforced, the entire hood portion may maintain a sufficient strength and have a reduced thickness and weight, thereby enhancing the grip feeling.

In the embodiment, the circumferential fiber layers positioned in the opening region may be in the inner layers closer to the reel leg to be inserted; therefore, the circumferential fiber layers may effectively increase the strength in the opening region. Further, the reinforcement fibers oriented in the circumferential direction may be continuous for one turn and may not be cut into parts, thus causing no reduction in strength or flaking; and the reinforcement fibers oriented in the axial direction may not be cut into parts, thus causing no reduction in strength. Additionally, the opening region may include the additional circumferential fiber layer formed of the reinforcement prepreg sheet 32 for increasing the thickness, thus increasing the compression rigidity and increasing the strength against compression.

The circumferential fiber layers should preferably be disposed in the inner layers of the opening region as in the embodiment, but may not be disposed in the inner layers as long as the proportion of the reinforcement fibers oriented in the circumferential direction is higher than in the portion adjacent to the operation nut 18. For example, the prepreg sheet 31 and the reinforcement prepreg sheet 32 attached on the bottom of the prepreg sheet 31 may be turned a plurality of times such that the axial fiber layers and the circumferential fiber layers are alternately stacked. Also, the reinforcement prepreg sheet 32 may be attached on the top of the prepreg sheet 31. That is, the order of the prepreg sheets 30 to 32 stacked together may be modified desirably. The circumferential fiber layers may have a uniform thickness or an gradually increasing thickness toward the opening in the region for receiving the reel leg, as long as the proportion of the reinforcement fibers oriented in the circumferential direction is higher in the portion adjacent to the opening 15c (the opening region) than in the portion adjacent to the operation nut 18. Alternatively, the circumferential fiber layer may be thinner or absent in the region between the portion adjacent to the operation nut 18 and the portion adjacent to the opening 15c.

In the embodiment, the axial fiber layer 31 extending across the entire length of the hood portion 15A may have a uniform thickness; therefore, the strength against a bending load may be increased.

Figure 7A:
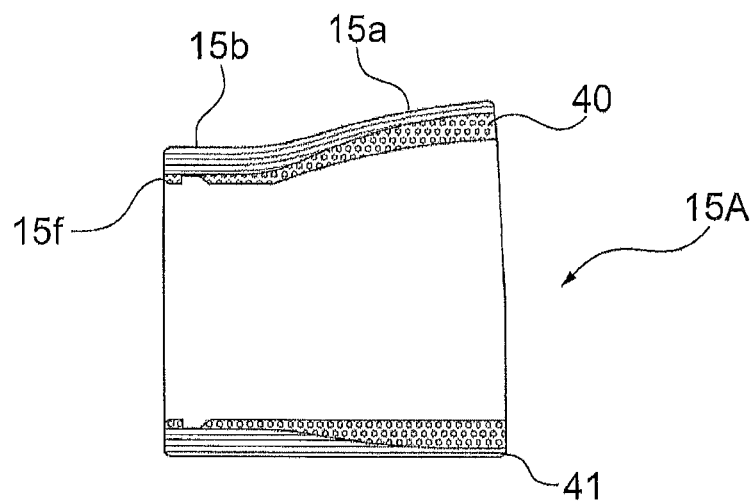
FIGS. 7a and 7b are sectional views showing different embodiments of the movable hood.
Figure 7B:
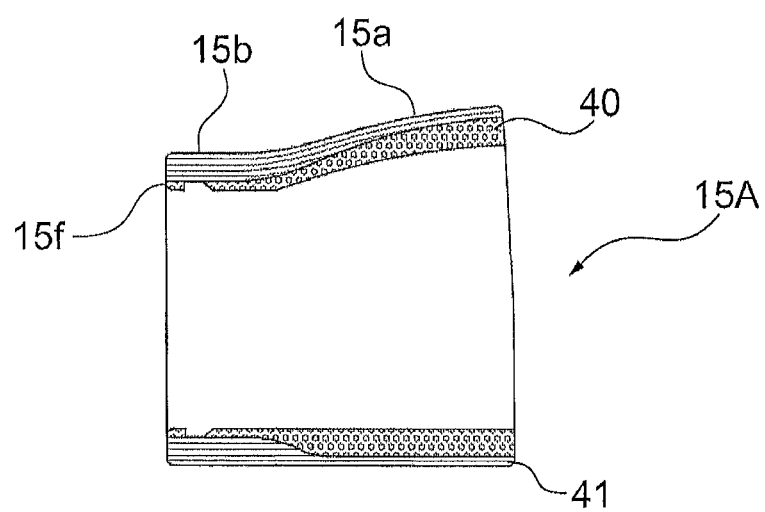

FIGS. 7a and 7b show individual embodiments of the hood portion. In these embodiments, the thickness of the hood portion 15A may be uniform across the axial length thereof, as opposed to the above embodiment where the thickness of the hood portion 15A is larger in the opening region. As shown in FIG. 7a, the circumferential fiber layer 40 disposed in the inner layer of the protrusion 15a may be thicker toward the opening to increase the proportion of the reinforcement fibers oriented in the circumferential direction, while the axial fiber layer 41 is thinner accordingly.

Figure 8:
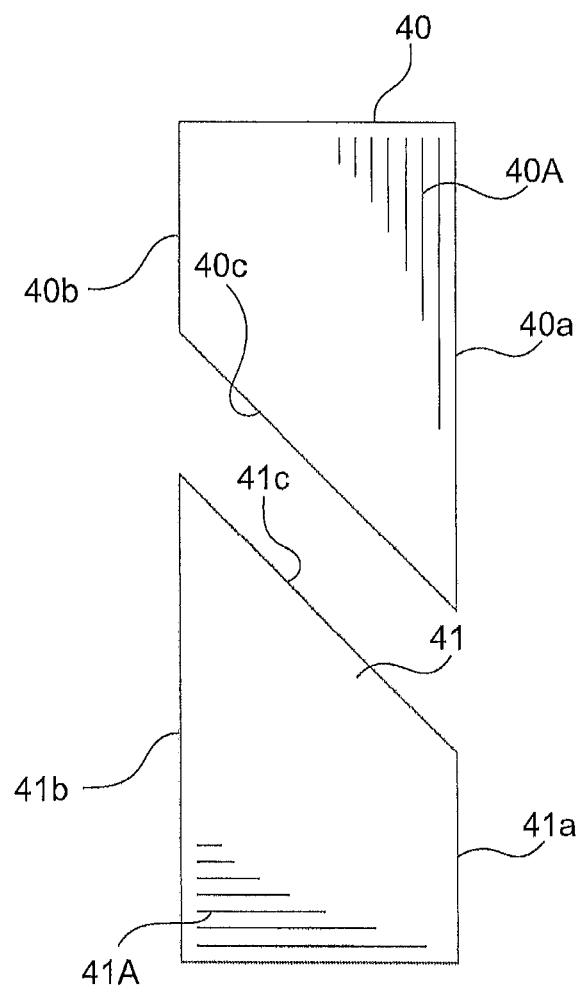

The hood portion 15A including the circumferential fiber layer 40 and the axial fiber layer 41 may be formed of the prepreg sheets 40, 41 shown in FIG. 8. In the inner layer of the hood portion 15A, the circumferential fiber layer may be formed by rolling the prepreg sheet 40 including the reinforcement fibers 40A arranged regularly in the circumferential direction. The prepreg sheet 40 may have an oblique edge 40c such that the rear end edge 40b thereof forms one ply on the mandrel and the front end edge 40a thereof forms two plies on the mandrel; and the prepreg sheet 40 thus shaped may be rolled such that the circumferential fiber layer 40 in the protrusion 15a is thicker toward the opening, as shown in FIG. 7a.

In the outer layer of the hood portion 15A, the axial fiber layer may be formed by rolling the prepreg sheet 41 including the reinforcement fibers 41A arranged regularly in the axial direction. The prepreg sheet 41 may have an oblique edge 41c such that the rear end edge 41b thereof forms two plies on the mandrel and the front end edge 41a thereof forms one ply on the mandrel; and the prepreg sheet 41 thus shaped may be rolled such that the axial fiber layer 41 in the protrusion 15a is thinner toward the opening, as shown in FIG. 7a.

Thus, the thickness of the hood portion 15A may be uniformed across the axial length thereof, and the proportion of the reinforcement fibers oriented in the circumferential direction in the opening region is higher, thereby making it possible to efficiently reduce the thickness and the weight of the entire hood portion 15A while maintaining the strength thereof. When a large load is imparted on the fishing reel having the reel leg thereof tightly fixed on the base rod 3, a larger bending load may be imparted on portions at larger distances from the middle of the reel leg (portions closer to the end of the butt end side leg portion 71b of the reel leg 71). As described above, the axial fiber layer 41 may be thicker toward the butt end side of the protrusion 15a; therefore, the strength of the hood portion may be efficiently maintained while reducing the thickness and the weight.

In the embodiment, the circumferential fiber layer 40 in the protrusion 15a may be thicker toward the opening; alternatively, the circumferential fiber layer 40 in the protrusion 15a may have a substantially uniformed thickness, as shown in FIG. 7b.

Figure 9:
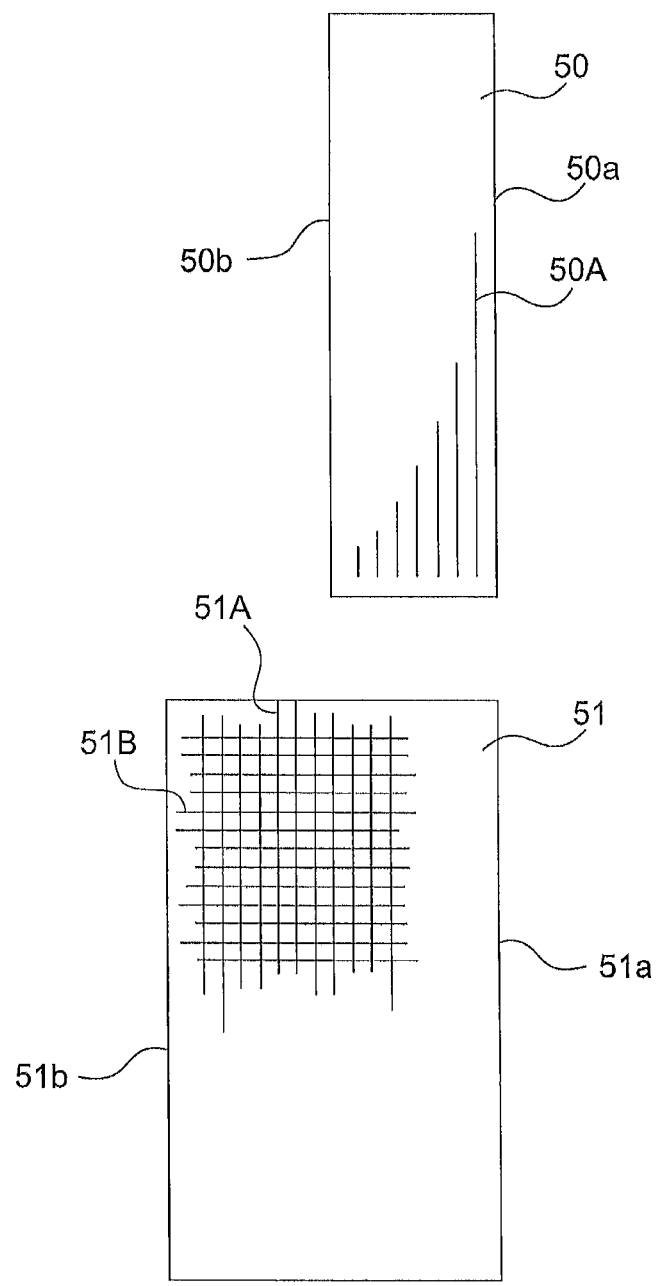
FIG. 9 shows an exemplary arrangement of prepreg sheets forming the movable hood of still another embodiment.

In the embodiment, the prepreg sheet may include the reinforcement fibers arranged regularly in a single direction (the circumferential direction); alternatively, the prepreg sheet may include the reinforcement fibers woven into a woven fabric. For example, as shown in FIG. 9, the prepreg sheet 51 constituting a body layer may include the reinforcement fibers 51A oriented in the circumferential direction and the reinforcement fibers 51B oriented in the axial direction woven together into a woven fabric. As in the above embodiment, such a prepreg sheet may be rolled such that the rear end edge 51b thereof is aligned with a portion in the cylindrical portion 80b of the mandrel (see FIG. 5), and the front end edge 51a thereof is aligned with the slope end 80d of the protrusion 80a of the mandrel. Further, inside the prepreg sheet 51 thus rolled may be rolled the reinforcement prepreg sheet 50 including the reinforcement fibers 50A arranged regularly in the circumferential direction. The prepreg sheet 52 may be rolled such that the rear end edge 50b thereof is aligned with a middle portion of the protrusion 80a of the mandrel, and the front end edge 50a thereof is aligned with the front end edge 51a of the prepreg sheet 51.

In the hood portion 15A formed of the prepreg sheets 50, 51, the proportion of the reinforcement fibers oriented in the circumferential direction is higher in the opening region than in the portion adjacent to the operation nut; therefore, the same advantage as in the above embodiment is obtained. Additionally, the surface of the hood portion may be constituted by a woven fabric layer including woven reinforcement fibers, effectively preventing breakage and flaking of the reinforcement fibers and increasing the strength and the stability.

As described above, the present invention is characterized in that the hood portion of the reel leg fixing apparatus may be formed of a fiber reinforced resin material such that the proportion of the reinforcement fibers oriented in the circumferential direction is higher in the opening region than in the portion adjacent to the operation nut, thereby efficiently increasing the strength and reducing the weight and the thickness. Thus, the prepreg sheets forming the hood portion may be susceptible to various modifications in characteristics such as the type, elasticity, resin content, and thickness of the reinforcement fibers and the condition of stacking. In the above embodiments, the reinforcement fibers oriented in the axial direction may be used to increase the strength against bending; alternatively, the reinforcement fibers oriented obliquely at a predetermined angle to the axial direction may be used. Such reinforcement fibers oriented obliquely may increase the strength against twisting in the protrusion 15a and the cylindrical portion 15b.

The cylindrical portion 15b of the hood portion 15A may not include the reinforcement fibers oriented in the circumferential direction, but should preferably include the circumferential fiber layer since the cylindrical portion 15b may contact the operation nut 18 and have a completely circular shape. Also, the opening region of the hood portion 15A may be constituted only by the circumferential fiber layer, but should preferably include the axial fiber layer, a woven fabric layer, or an oblique fiber layer. If the opening region includes prepreg sheets such that the reinforcement fibers therein are oriented in three directions including the circumferential direction, the hood portion may have a reduced weight and an increased strength efficiently.

Figure 10:
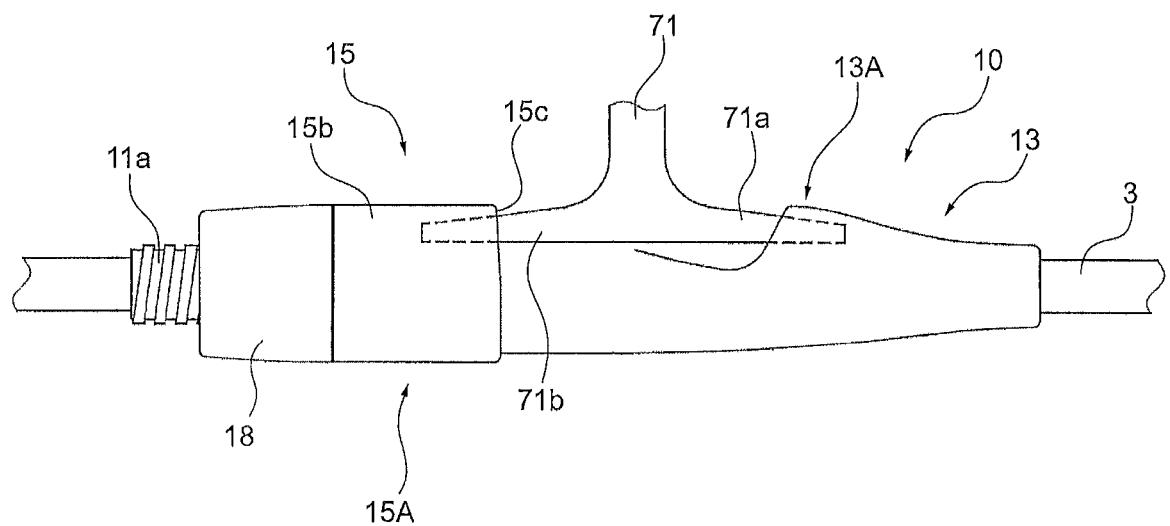
FIG. 10 is a side view showing a reel leg fixing apparatus having a movable hood without a protrusion.
Figure 11A:
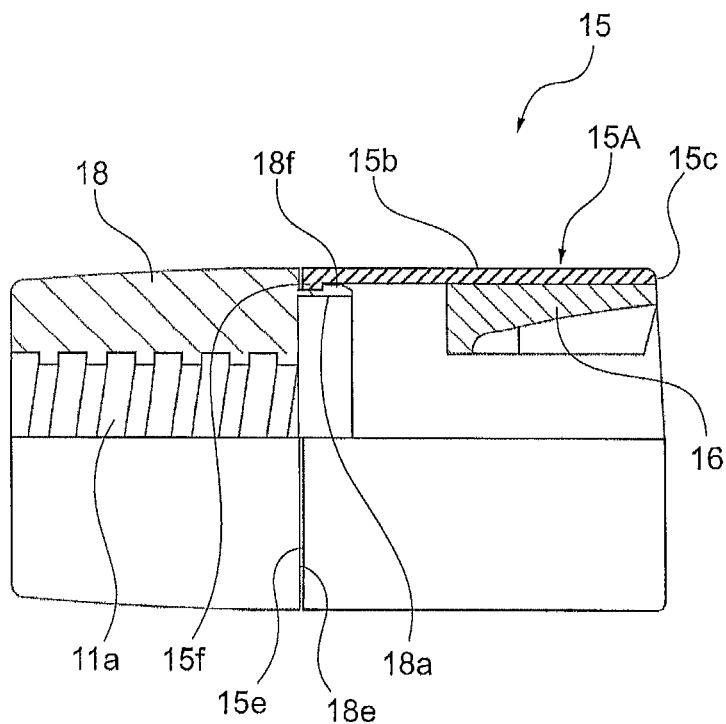
FIG. 11a is a partially sectional view showing a main part of the movable hood shown in FIG. 10.
Figure 11B:
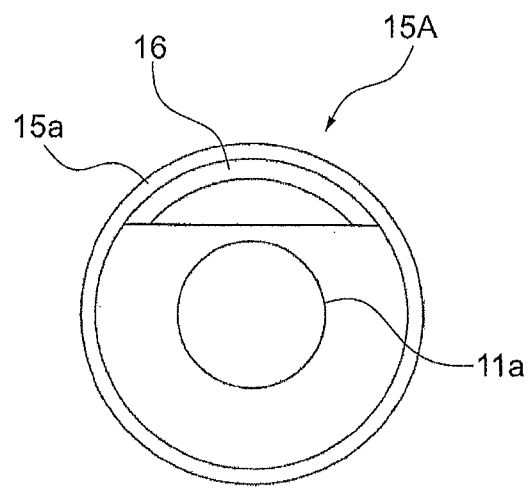
FIG. 11b shows the movable hood shown in FIG. 11a as viewed from the opening.

The hood portion 15A of the reel leg fixing apparatus may include the protrusion 15a; but it may also be possible that the hood portion does not include the protrusion. For example, as shown in FIGS. 10 and 11, the hood portion 15A of the movable hood 15 may be constituted by the cylindrical portion 15b having the same outer diameter as the operation nut 18 but may not include the protrusion, and the cylindrical portion 15b may have the opening 15c for receiving the reel leg. In this arrangement, the pad member 16 attached on the inner surface of the hood portion 15A may be made slightly thicker than in FIG. 3 so as to form the inner surface conforming to the reel leg inserted. Such a hood portion 15A may allow the mandrel for forming the hood portion to have a cylindrical shape and facilitate rolling of the prepreg sheets as described above. The above arrangement may also be applied to the hood portion 13A of the fixed hood 13. The fixed hood should be configured such that the proportion of the reinforcement fibers oriented in the circumferential direction is higher in the opening region than in the butt end side. Further, the hood portion formed as described above may be coated for improving the appearance or protecting the surface or treated with vapor deposition of a metal or ceramic.

Figure 12:
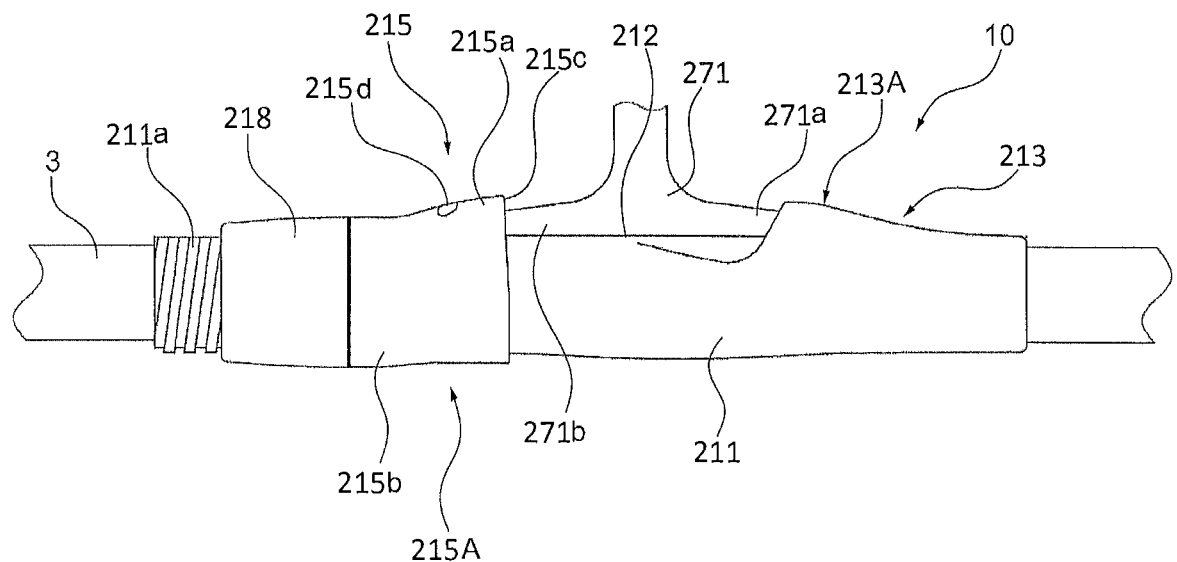
FIG. 12 shows an embodiment of a reel leg fixing apparatus according to the present invention.
Figure 13:
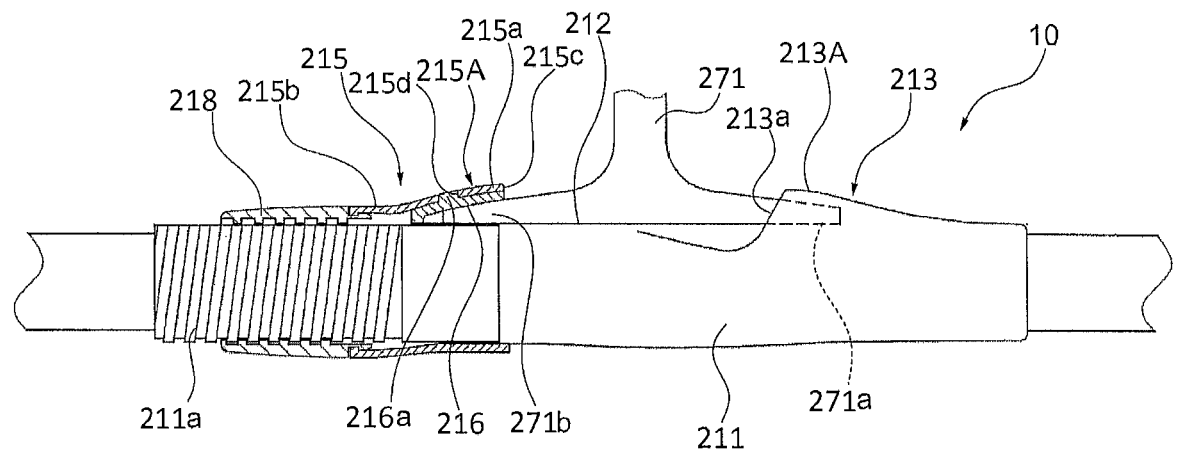
FIG. 13 is a partially sectional view of the reel leg fixing apparatus shown in FIG. 12, showing the arrangement of the movable hood.

The reel leg fixing apparatus in one or more other embodiments of the present invention will be described in detail below with reference to FIGS. 12 to 14. The reel leg fixing apparatus 10 may include a reel seat body (hereinafter referred to as "body") 211 shaped in a tube to be fitted around the base rod 3. The body 211 may be integrally formed of a synthetic resin and include a placement surface 212 on which the reel leg 271 of the fishing reel 70 may be placed, a fixed hood 213 disposed adjacent to the placement surface 212 on the tip side, and a movable hood 215 disposed adjacent to the placement surface 212 on the butt end side.

The fixed hood 213 may be formed integrally with the body 211 and include a hood portion 213A protruding so as to receive a tip-side leg portion 271a of the reel leg 271 which is to be inserted through an opening 213a in the hood portion 213A. It may also be possible that the hood portion 213A is formed separately from the body 211 and then integrated with the body 211, as may be for the hood portion of the movable hood (described later).

The movable hood 215 may be movable along the axial direction and include a hood portion 215A formed separately from the body 211. The hood portion 215A of the embodiment may include a protrusion 215a protruding so as to be capable of receiving a butt end-side leg portion 271b of the reel leg 271, and a cylindrical portion 215b formed integrally on the butt end side of the protrusion 215a. That is, the protrusion 215a may be shaped such that an arcuate area in a certain region of the outer circumference of the cylindrical portion 215b gradually rises toward the tip; and the butt end-side leg portion 271b of the reel leg 271 may be inserted through the opening 215c in the protrusion 215a.

Inside the protrusion 215a may be disposed a pad member 216 so as to be pressed by the surface of the butt end-side leg portion 271b of the reel leg 271 inserted. When the movable hood 215 is moved toward the fixed hood, the pad member 216 may be pressed against the surface of the butt end-side leg portion 271b of the reel leg 271 so as to securely fix the reel leg 271. The pad member 216 may be shaped so as to conform to the surface of the butt end-side leg portion 271b of the reel leg 271, When a projection 216a is fitted in a hole 215d formed in the protrusion 215a of the movable hood 215, the pad member 216 may be integrated with the inner surface of the protrusion 215a.

In the butt end-side of the body 211 may be integrally formed an external thread 211a. On the external thread 211a may be screwed an operation nut 218 which may be rotated to move along the axial direction. The operation nut 218 may be engaged at the front end thereof with the hood portion 215A (the cylindrical portion 215b) of the movable hood 215. In this engagement, the operation nut 218 rotated in the direction to tighten it may be moved toward the fixed hood without rotation of the movable hood 215, and the operation nut 218 rotated in the direction to loosen it may be moved away from the fixed hood without rotation of the movable hood 215.

Figure 14A:
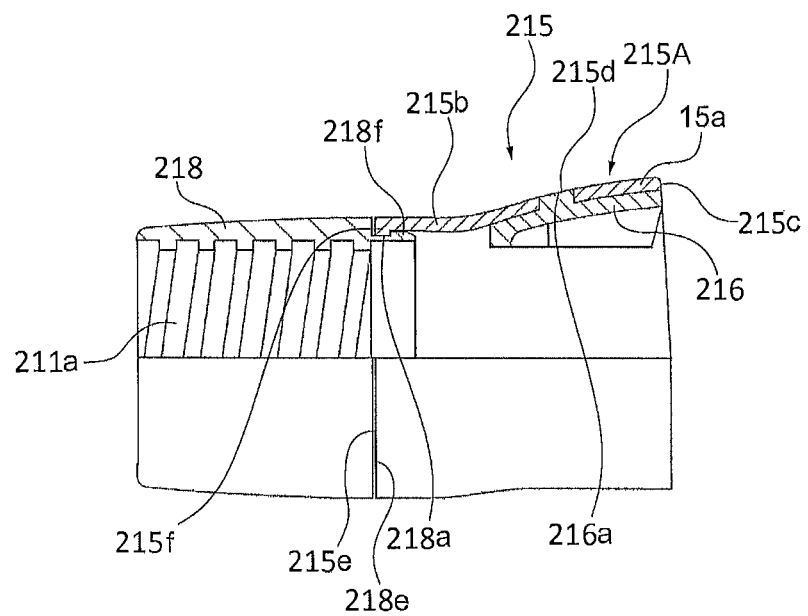
FIG. 14a is an enlarged view of a main part of the reel leg fixing apparatus shown in FIG. 13.
Figure 14B:
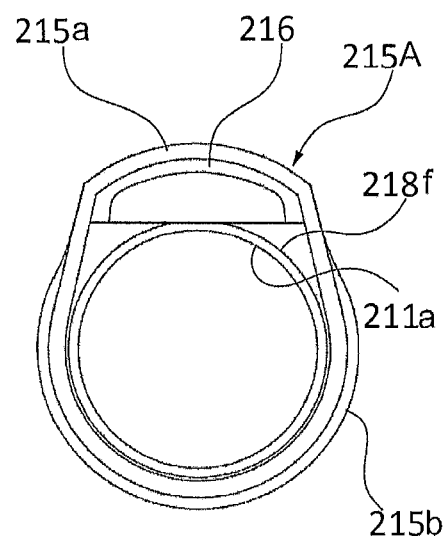
FIG. 14b shows the movable hood shown in FIG. 14a as viewed from the opening.

More specifically, as shown in FIG. 14a, an annular projection 218a may be formed on an end edge 218e of the operation nut 218 facing the cylindrical portion 215b; an locking projection 218f projecting radially outward may be formed in the tip end of the annular projection 218a; and an locking projection 215f projecting radially inward may be formed in an end edge 215e of the cylindrical portion 215b facing the operation nut 218. The locking projection 218f and the locking projection 215f may be locked on each other.

With such an engagement between the operation nut 218 and the hood portion 215A (the cylindrical portion 215b), the operation nut 218 rotated in the direction to tighten it may be screwed toward the fixed hood while the hood portion 215A (the cylindrical portion 215b) is moved toward the fixed hood without rotation since the end edge 218e contacts the end edge 215e. Thus, the reel leg 271 placed on the placement surface 212 may be tightly fixed by the pair of hood portions (the fixed hood 213A and the movable hood 215A). The operation nut 218 rotated in the direction to loosen it may be screwed away from the fixed hood while the hood portion 215A (the cylindrical portion 215b) is moved away from the fixed hood without rotation since the locking projection 215f is engaged with the locking projection 218f. Thus, the reel leg 271 placed on the placement surface 212 can be detached from the pair of hood portions (the fixed hood 213A and the movable hood 215A).

The hood portion 215A of the movable hood 215 may be formed of a fiber reinforced resin material so as to reduce the weight while maintaining the strength at a certain level. More specifically, the hood portion 215A may be formed of a plurality of prepreg sheets having different specifications stacked together into a tubular shape. Each of the prepreg sheets may include reinforcement fibers such as carbon fibers, glass fibers, or aramid fibers arranged regularly in a certain orientation or woven, and the reinforcement fibers may be impregnated with a thermoplastic resin (such as Nylon, polypropylene, polyphenyl sulfide, or thermoplastic polyurethane) or a thermosetting resin (such as epoxy resin, phenol resin, or polyester resin) as a matrix resin. The arrangement of the hood portion 215A will be described in detail below.

The hood portion 215A tend to be subjected to a twisting force particularly in casting a tackle or manipulating the fishing rod. In the opening region of the protrusion 215a, particularly near the end edge region along the opening 215c, the reinforcement fibers arranged regularly in only the axial direction (of the base rod 3) may have a low torsional strength and may be prone to cracking or breakage caused by a cutting force imparted on the hood portion 215A due to twisting in casting a tackle or manipulating the fishing rod. Thus, there may be variation of orientation of the reinforcement fibers in the protrusion 215a of the hood portion 215A for resistance particularly to torsional load.

Figure 15A:
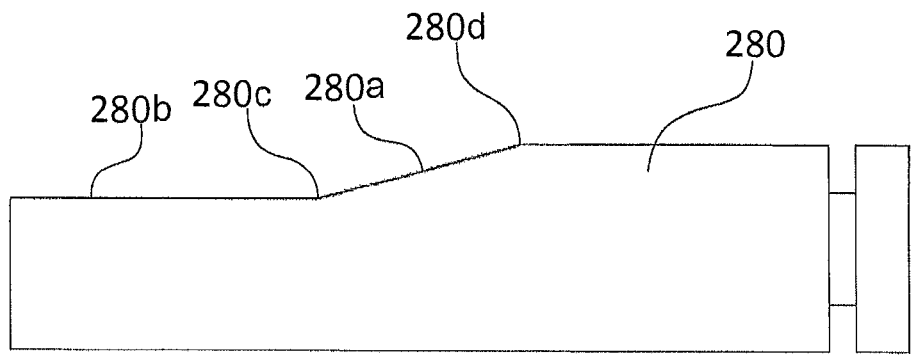
FIG. 15a is a side view of a mandrel around which prepreg sheets are to be rolled for forming the movable hood.
Figure 15B:
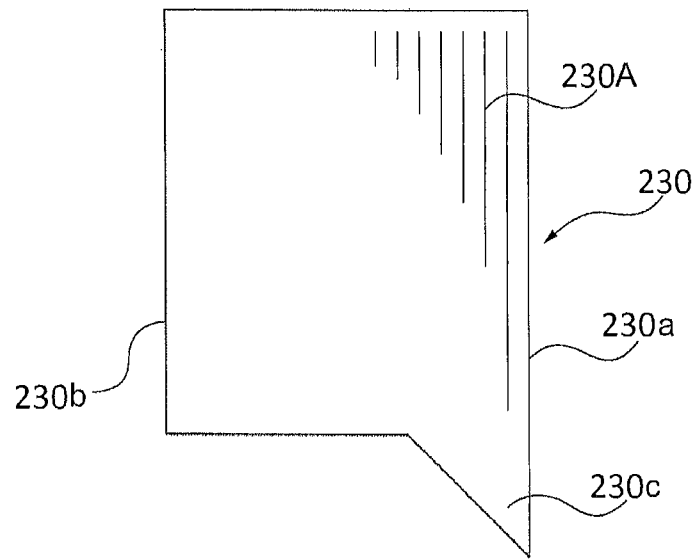
FIG. 15b is a plane view of a prepreg sheet including reinforcement fibers oriented in the axial direction, for forming the movable hood.

FIG. 15b shows a prepreg sheet 230 addressing the torsional load imparted on the hood portion 215A, and FIG. 15a shows a mandrel 280 around which the prepreg sheet 230 is to be rolled. The hood portion 215A may be formed by rolling, on a mandrel 280 having a predetermined shape, a plurality of prepreg sheets having different specifications (FIG. 15b shows only the prepreg sheet 230 for simplicity), heating the prepreg sheets to cure the synthetic resin, and then pulling out the mandrel 280.

On the surface of the mandrel 280 may be formed a protrusion 280a and a cylindrical portion 280b so as to conform to the shape of the hood portion 215A. That is, the cylindrical portion 280b may have a circular section and may be included in the cylindrical portion 215b of the hood portion 215A. The protrusion 280a may have a slope gradually rising forward from a circumferential part of the end 280c of the cylindrical portion 280b (a predetermined arcuate range corresponding to the reel leg to be inserted) (the slope end 280d may correspond to the opening 215c of the protrusion 215a of the hood portion 215A); and the slope may be included in the protrusion 215a of the hood portion 215A.

In the embodiment, the hood portion 215A may be formed by rolling on the mandrel 280 one or more prepreg sheets including the prepreg sheet 230 to cover the entire axial length of the hood portion 215A, as will be described below.

In the inner layer of the hood portion 215A, at least a circumferential fiber layer (or an oblique fiber layer such as a woven fabric) may be disposed by rolling a prepreg sheet including the reinforcement fibers arranged regularly in, e.g., the circumferential direction (or in an oblique direction at an angle smaller than 90° with respect to the axial direction) (this prepreg sheet is not shown). Outside the prepreg sheet rolled as above may be rolled the prepreg sheet 230 including the reinforcement fibers 230A arranged regularly in the axial direction and uncut, constituting the axial fiber layer.

The prepreg sheet 230 constituting the axial fiber layer may be positioned and rolled around the mandrel 280 such that the rear end edge 230b and the front end edge 230a thereof are aligned with the rear end edge and the front end edge of the prepreg sheet in the inner layer, respectively. More specifically, the prepreg sheet 30 may be rolled such that the rear end edge 230b thereof is aligned with a portion in the cylindrical portion 280b, and the front end edge 230a thereof is aligned with the slope end 280d of the protrusion 280a of the mandrel 280. As a result, the reinforcement fibers 230A oriented in the axial direction may also be continuous in the axial direction and may not be cut.

The front end edge 230a of the prepreg sheet 230 may be positioned slightly ahead of the slope end 280d of the mandrel 280 and may be cut off after the heat curing. Since the circumference of the protrusion 280a is larger than the circumference of the cylindrical portion 280b, the prepreg sheet 230 may have an oblique end 230c such that the rear end edge 230b forms one ply on the mandrel 280 and the front end edge 230a forms one or more plies on the mandrel 280.

Figure 16A:
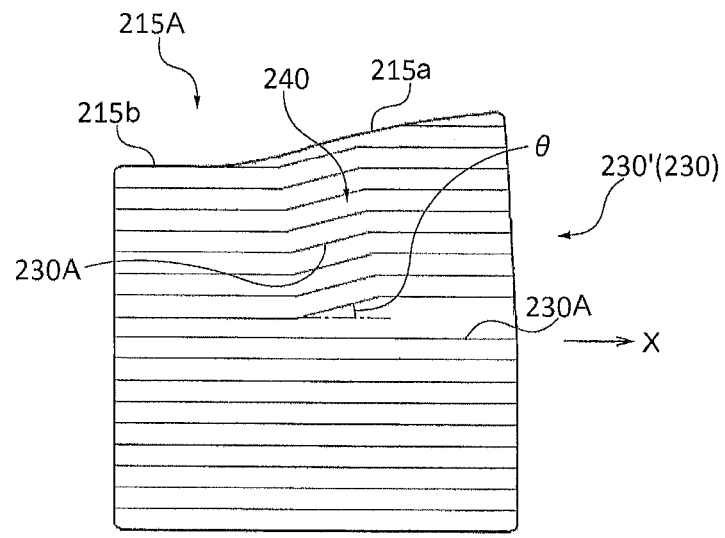
FIG. 16a is a side view of the prepreg sheet shown in FIG. 15b rolled into a tubular shape to form the hood portion.
Figure 16B:
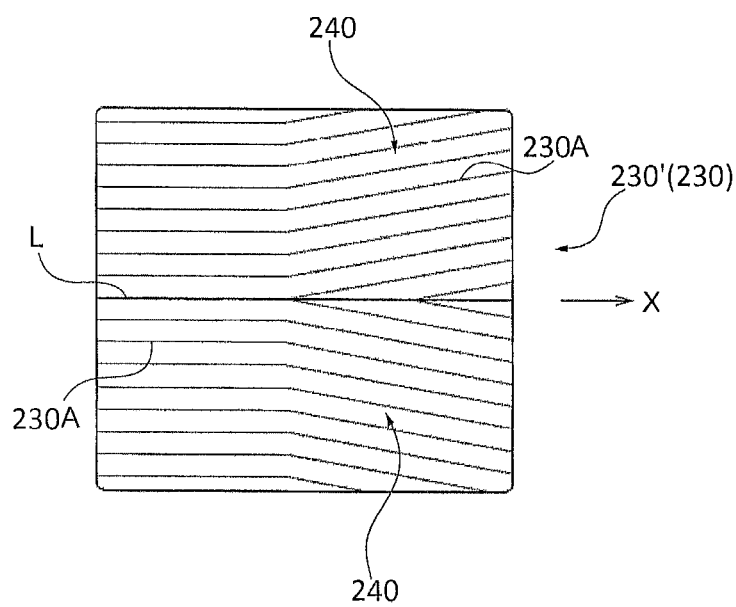

After the prepreg sheet 230 is thus rolled around the mandrel 280, the reinforcement fibers 230A in the protrusion 280a may be bent due to spreading of the resin included in the prepreg sheet 230. As shown in FIGS. 16a and 16b, a region 240 where the reinforcement fibers 230A oriented in the axial direction may be oblique to the axial direction X may be formed in a portion corresponding to the protrusion 215a of the hood portion 215A, or more generally in a portion in the protrusion 215a corresponding to a region having a predetermined length and ranging from the end 280c of the cylindrical portion 280b to the slope end 280d of the mandrel 280. FIGS. 16a and 16b show the prepreg sheet 230 rolled into a tubular shape and constituting the hood portion 215A with a reference numeral 230', wherein FIG. 16a is a side view of the prepreg sheet shown in FIG. 15b rolled into a tubular shape and constituting the hood portion, and FIG. 16b is a plane view of the prepreg sheet shown in FIG. 16a.

The tilt angle θ of the reinforcement fibers 230A with respect to the axial direction X in the region 240 should preferably be 5° or larger. The angle θ may be either consistent across the region 240 or gradually increasing toward the opening 215c of the hood portion 215A. The region 240 may be disposed at a desired position in the protrusion 215a of the hood portion 215A continuously (to, e.g., the opening 215c of the hood portion 215A) or separately; but as described later, the region 240 should preferably be disposed symmetrically on both left and right sides of the hood portion 215A so as to effectively and efficiently ensure the torsional strength (FIG. 16b shows the symmetry axis L). Particularly when the region 240 is disposed near the opening 215c of the hood portion 215A that tends to be subjected to a large torsional force, twisting can be securely and effectively suppressed at this portion.

Figure 17:
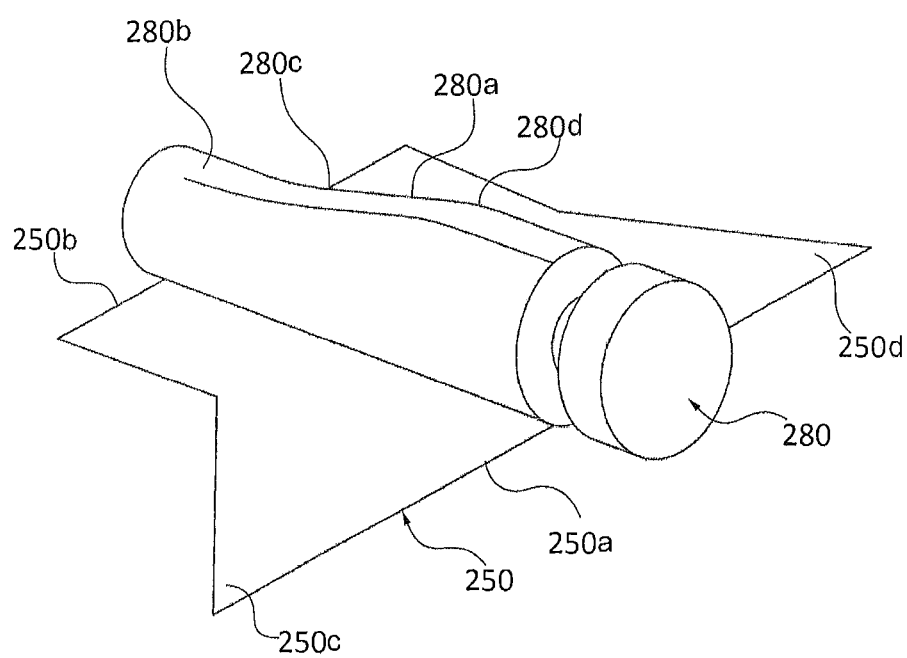
FIG. 17 is a perspective view showing a simplified example of a method of fabricating the hood portion by rolling prepreg sheets according to an exemplary variation around a mandrel for forming the movable hood.
Figure 18A:
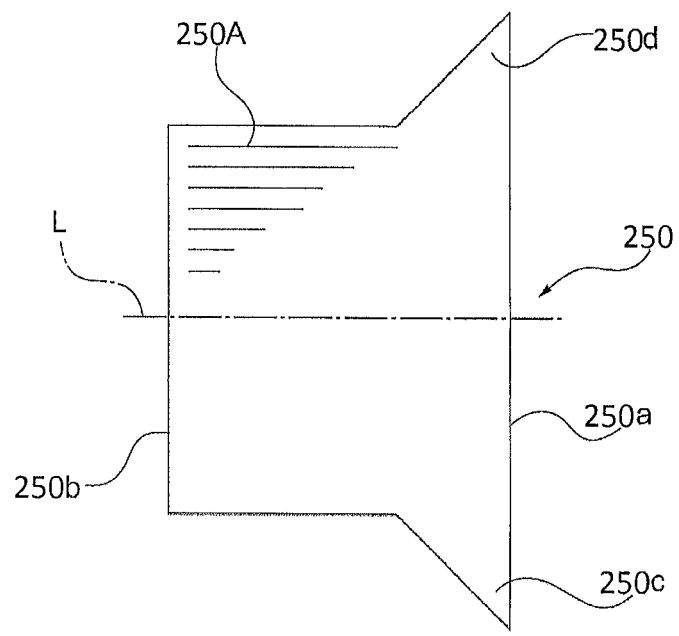
FIG. 18a is a plane view of the prepreg sheets shown in FIG. 17 according to the exemplary variation including reinforcement fibers oriented in the axial direction for forming the movable hood.
Figure 18B:
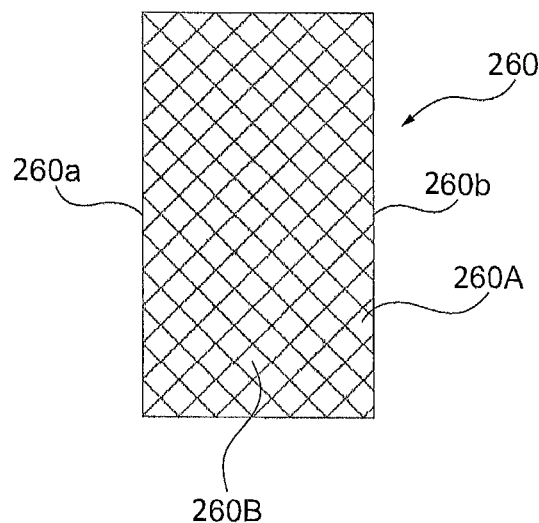
FIG. 18b is a plane view of a reinforcement prepreg sheet like a woven fabric including reinforcement fibers arranged regularly and oriented obliquely to the axial direction.

FIGS. 17, 18a, and 18b show an example of a method of fabricating a hood portion 215A including the regions 240 at both left and right sides of the hood portion 215A. This fabrication method is a mere example for simply forming the regions 240, and the region 240 can also be formed by other various methods.

This fabrication method may employ a prepreg sheet 250 according to a variation example shown in FIG. 18a and having a symmetric shape with respect to the symmetry axis L (where the reinforcement fibers 250A oriented in the axial direction may be arranged symmetrically). As shown in FIG. 17, the prepreg sheet 250 may be rolled on both left and right sides of the outer circumference of the mandrel 280 positioned in the symmetry axis L of the prepreg sheet 250. Thus, as described above, the reinforcement fibers 230A may be bent in the protrusion 280a of the mandrel 280 due to spreading of the resin of the prepreg sheet 230 in the protrusion 280a, and the regions 240 where the reinforcement fibers 250A oriented in the axial direction are oblique with respect to the axial direction may be formed symmetrically in the hood portion 215A (see FIG. 16b).

As described above, the prepreg sheet 250 may be rolled on the mandrel 280 such that the rear end edge 250b thereof is aligned with a portion in the cylindrical portion 280b of the mandrel 280, and the front end edge 250a thereof is aligned with the slope end 280d of the protrusion 280a of the mandrel 280. As a result, the reinforcement fibers 250A oriented in the axial direction may also be continuous in the axial direction and may not be cut. Since the circumference of the protrusion 280a is larger than the circumference of the cylindrical portion 280b, the prepreg sheet 250 may have oblique ends 250c, 250d on both side ends such that the rear end edge 250b forms one ply on the mandrel 280 and the front end edge 250a forms one or more plies on the mandrel 280.

In this fabrication method (and naturally in rolling of the prepreg sheet as shown in FIGS. 15a and 15b), a reinforcement layer may be provided in the front portion of the hood portion 215A. More specifically, the reinforcement layer may be constituted by a reinforcement prepreg sheet 260 including the reinforcement fibers 260A, 260B oriented obliquely at angles smaller than ⌀ 90° with respect to the axial direction and woven into a woven fabric. The reinforcement prepreg sheet 260 may be rolled inside or outside the front portion (on the protrusion 215a) of the prepreg sheet 250. The prepreg sheet 260 may be rolled such that the rear end edge 260b thereof is aligned with a middle portion of the cylindrical portion 280b of the mandrel 280, and the front end edge 260a thereof is aligned with the front end edge 250a of the prepreg sheet 250.

With the above arrangement, the prepreg sheets may be stacked together to form the hood portion 215A having a tubular shape, thereby reducing the weight. The hood portion 215A may include the reinforcement fibers oriented at least in the axial direction and extending continuously across the entire length of the hood portion 215A, preventing reduction in strength and breakage. Further, the hood portion 215A may include a region 240 in the protrusion 215a where the reinforcement fibers oriented in the axial direction are oblique with respect to the axial direction. Therefore, the region 240 may have a high strength against twisting because of the obliqueness of the fibers. Thus, since the prepreg sheet including the reinforcement fibers oriented in the axial direction includes the region 240 where the reinforcement fibers oriented in the axial direction are oblique with respect to the axial direction (an appropriate part of the continuous axial fibers are oblique), the hood portion as a whole can be efficiently reinforced without using unnecessary prepreg sheets, resultantly reducing the thickness and the weight of the entire hood portion.

The present invention is not limited to the above description but can be modified variously. For example, the region 240 can be formed desirably, besides the fabrication method in the above embodiments where the region 240 is formed by deformation of the reinforcement fibers in the prepreg sheet rolled on the mandrel caused by the shape of the protrusion 280a of the mandrel 280. Essentially, the prepreg sheet including the reinforcement fibers oriented in the axial direction should include in the protrusion 215a the region 240 where the reinforcement fibers oriented in the axial direction are oblique with respect to the axial direction (an appropriate part of the continuous axial fibers are oblique).

Figure 19:
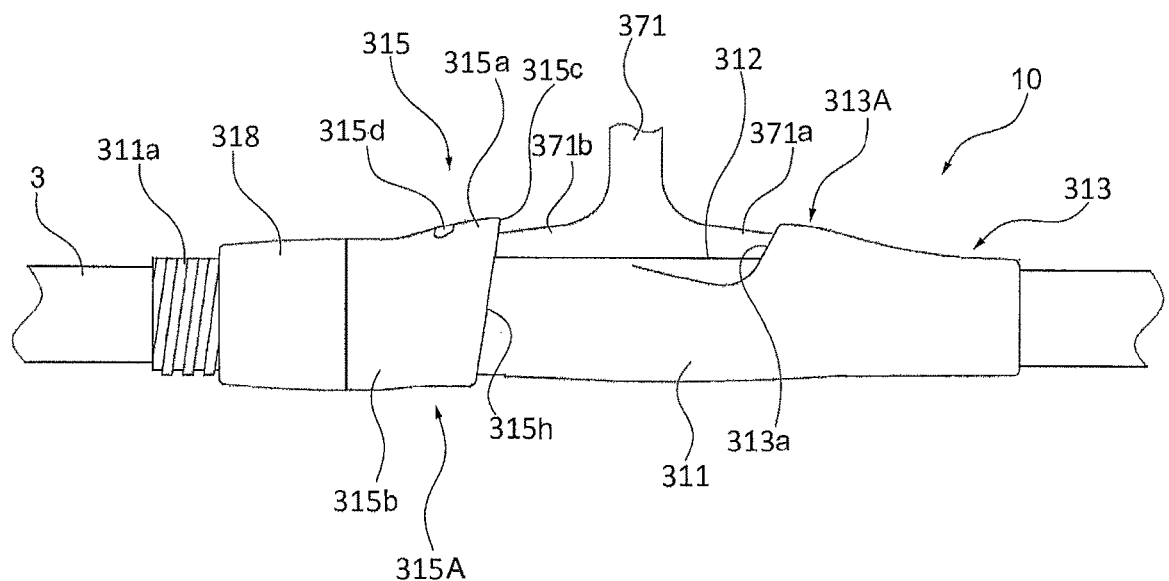
FIG. 19 shows an embodiment of a reel leg fixing apparatus according to the present invention.
Figure 20:
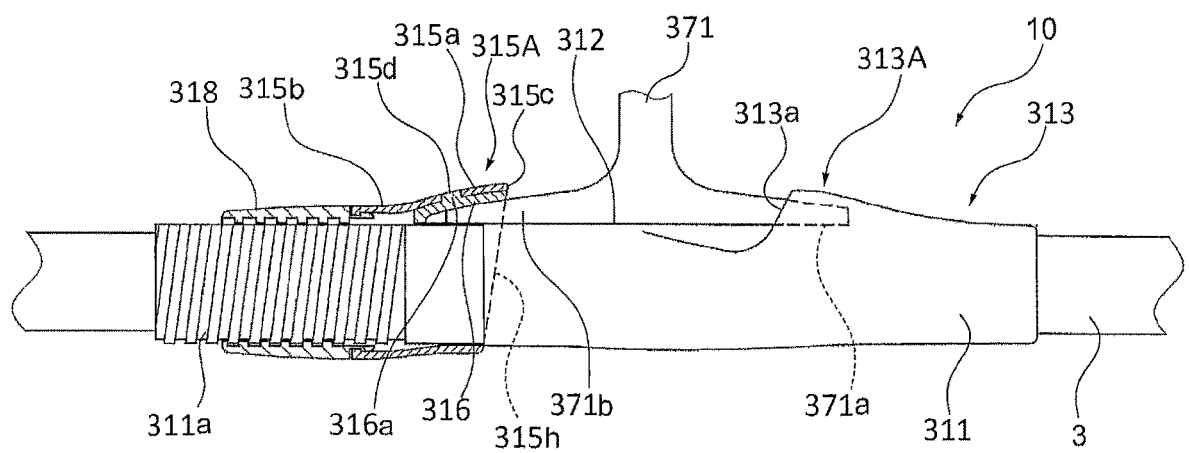
FIG. 20 is a partially sectional view of the reel leg fixing apparatus shown in FIG. 19, showing the arrangement of the movable hood.
Figure 21A:
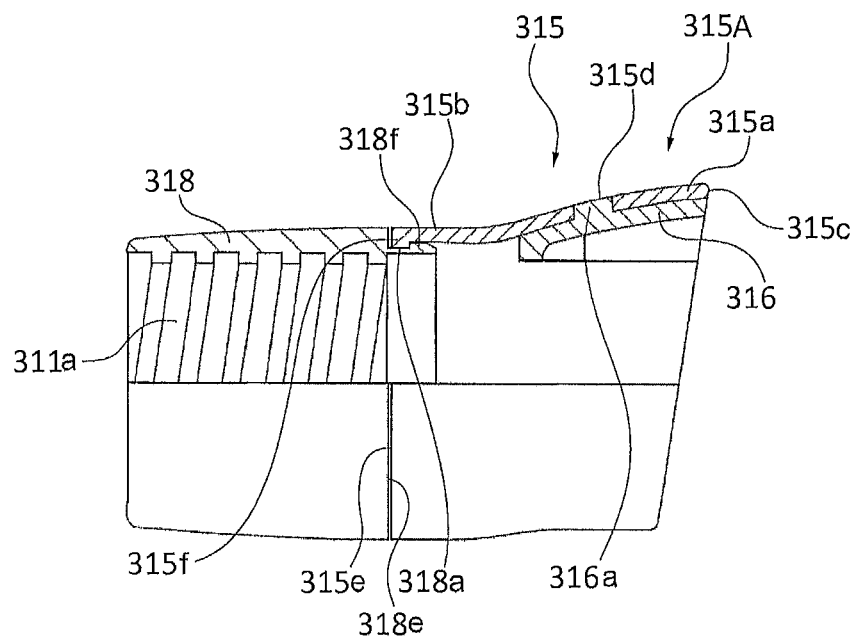
FIG. 21a is an enlarged view of a main part of the reel leg fixing apparatus shown in FIG. 20.
Figure 21B:
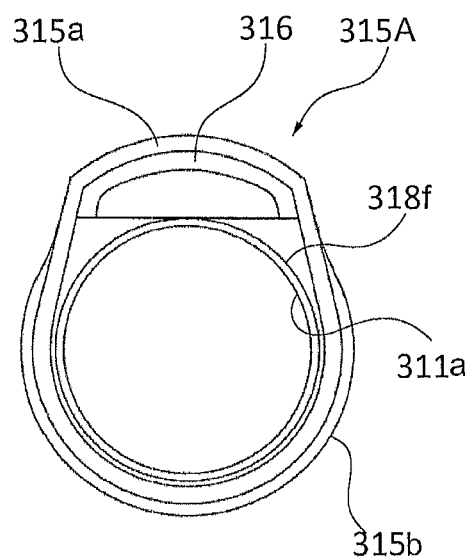
FIG. 21b shows the movable hood shown in FIG. 21a as viewed from the opening.

The reel leg fixing apparatus in one or more other embodiments of the present invention will be described below with reference to FIGS. 19 to 21b. FIG. 19 is a side view of the reel leg fixing apparatus; FIG. 20 is a partially sectional view of the reel leg fixing apparatus shown in FIG. 19, showing the arrangement of the movable hood; FIG. 21a is an enlarged view of a main part of the reel leg fixing apparatus shown in FIG. 20; and FIG. 21b shows the movable hood shown in FIG. 21a as viewed from the opening.

The reel leg fixing apparatus 10 may include a reel seat body (hereinafter referred to as "body") 311 shaped in a tube to be fitted around the base rod 3. The body 311 may be integrally formed of a synthetic resin and include a placement surface 312 on which the reel leg 371 of the fishing reel 70 may be placed, a fixed hood 313 disposed adjacent to the placement surface 312 on the tip side, and a movable hood 315 disposed adjacent to the placement surface 312 on the butt end side.

The fixed hood 313 may be formed integrally with the body 311 and include a hood portion 313A protruding so as to receive a tip-side leg portion 371a of the reel leg 371 which is to be inserted through an opening 313a in the hood portion 313A. It may also be possible that the hood portion 313A is formed separately from the body 311 and then integrated with the body 311, as may be for the hood portion of the movable hood (described later).

The movable hood 315 may be movable along the axial direction and include a hood portion 315A formed separately from the body 311. The hood portion 315A of the embodiment may include a protrusion 315a protruding so as to be capable of receiving a butt end-side leg portion 371b of the reel leg 371, and a cylindrical portion 315b formed integrally on the butt end side of the protrusion 315a. That is, the protrusion 315a may be shaped such that an arcuate area in a certain region of the outer circumference of the cylindrical portion 315b gradually rises toward the tip; and the butt end-side leg portion 371b of the reel leg 371 may be inserted through the opening 315c in the protrusion 315a.

Inside the protrusion 315a may be disposed a pad member 316 so as to be pressed by the surface of the butt end-side leg portion 371b of the reel leg 371 inserted. When the movable hood 315 is moved toward the fixed hood, the pad member 316 may be pressed against the surface of the butt end-side leg portion 371b of the reel leg 371 so as to securely fix the reel leg. The pad member 316 may be shaped so as to conform to the surface of the butt end-side leg portion 371b of the reel leg 371. When a projection 316a is fitted in a hole 315d formed in the protrusion 315a of the movable hood 315, the pad member 316 may be integrated with the inner surface of the protrusion 315a.

In the butt end-side of the body 311 may be integrally formed an external thread 311a. On the external thread 311a may be screwed an operation nut 318 which may be rotated to move along the axial direction. The operation nut 318 may be engaged at the front end thereof with the hood portion 315A (the cylindrical portion 315b) of the movable hood 315. In this engagement, the operation nut 318 rotated in the direction to tighten it may be moved toward the fixed hood without rotation of the movable hood 315, and the operation nut 318 rotated in the direction to loosen it may be moved away from the fixed hood without rotation of the movable hood 315.

More specifically, as shown in FIG. 21a, an annular projection 318a may be formed on an end edge 318e of the operation nut 318 facing the cylindrical portion 315b; an locking projection 318f projecting radially outward may be formed in the tip end of the annular projection 318a; and an locking projection 315f projecting radially inward may be formed in an end edge 315e of the cylindrical portion 315b facing the operation nut 318. The locking projection 318f and the locking projection 315f may be locked on each other.

With such an engagement between the operation nut 318 and the hood portion 315A (the cylindrical portion 315b), the operation nut 318 rotated in the direction to tighten it may be screwed toward the fixed hood while the hood portion 315A (the cylindrical portion 315b) is moved toward the fixed hood without rotation since the end edge 318e contacts the end edge 315e. Thus, the reel leg 371 placed on the placement surface 312 may be tightly fixed by the pair of hood portions (the fixed hood 313A and the movable hood 315A). The operation nut 318 rotated in the direction to loosen it may be screwed away from the fixed hood while the hood portion 315A (the cylindrical portion 315b) is moved away from the fixed hood without rotation since the locking projection 315f is engaged with the locking projection 318f. Thus, the reel leg 371 placed on the placement surface 312 can be detached from the pair of hood portions (the fixed hood 313A and the movable hood 315A).

An oblique end 315h may be formed in the end edge of the hood portion 315A along the opening. The oblique end 315h may be formed to reduce the weight and enhance the appearance design of the hood portion 315A and may extend from the opening region through which the reel leg 371 is to be inserted, to the opposite region along the surfaces of both sides so as to be oblique with respect to the axial direction (and so as to be symmetric on both sides).

The hood portion 315A of the movable hood 315 may be formed of a fiber reinforced resin material shaped into a tube so as to reduce the weight while maintaining the strength at a certain level. Examples of the fiber reinforced resin material to be shaped into a tube may include a prepreg sheet including reinforcement fibers impregnated with a synthetic resin (or a plurality of such prepreg sheets having different specifications) and a fiber reinforced resin tape including reinforcement fibers arranged regularly in one orientation (which may be combined with a prepreg sheet).

Each of the prepreg sheets may include reinforcement fibers such as carbon fibers, glass fibers, or aramid fibers arranged regularly in a certain orientation or woven, and the reinforcement fibers may be impregnated with a thermoplastic resin (such as Nylon, polypropylene, polyphenyl sulfide, or thermoplastic polyurethane) or a thermosetting resin (such as epoxy resin, phenol resin, or polyester resin) as a matrix resin. As with the prepreg sheets, the fiber reinforcement resin tape may also include the reinforcement fibers arranged regularly in one orientation and impregnated with a synthetic resin. The arrangement of the hood portion 315A will be described in detail below.

When the hood portion 315A fixes the reel leg 371 tightly, the portion around the opening 315c may be subjected to a force to expand the opening imparted from the surface of the butt end side leg portion 371b of the reel leg 371 abutting thereon. On the opening side of the protrusion 315a, particularly in the edge region of the opening 315c, the reinforcement fibers may be arranged regularly in the axial direction (of the base rod 3); therefore, cracking may tend to occur in the axial direction and reduce the strength. Thus, the opening region may include a fiber reinforced resin material having reinforcement fibers oriented in the circumferential direction so as to resist the load to expand the opening.

When the hood portion 315A fixes the reel leg tightly, the region of the protrusion 315a of the hood portion 315A other than the opening region may be subjected to only a small amount of load imparted in the direction to expand the opening, but may be subjected to a bending force along the axial direction. Thus, the region from the opening region to the cylindrical portion 315b should preferably include a fiber reinforced resin material having reinforcement fibers oriented in the axial direction so as to resist mainly the bending load.

As described above, the opening region may include a fiber reinforced resin material including the reinforcement fibers arranged in the circumferential direction. However, in forming a tube having an oblique end 315h as in the present invention, it is not preferable that the reinforcement fibers are oriented in a (circumferential) direction orthogonal to the axial direction (of the base rod). When the tube is cut obliquely to form the oblique end 315h, the reinforcement fibers oriented in the circumferential direction may be cut, reducing the strength and causing cracking and breakage. Therefore, the fiber reinforced resin material in the hood portion 315A according to the present invention may include the reinforcement fibers oriented along the sloped end 315h such that the reinforcement fibers oriented in the circumferential direction are continuous circumferentially (a layer including the reinforcement fibers oriented in such a direction is referred to as "an oblique fiber layer").

Figure 22:
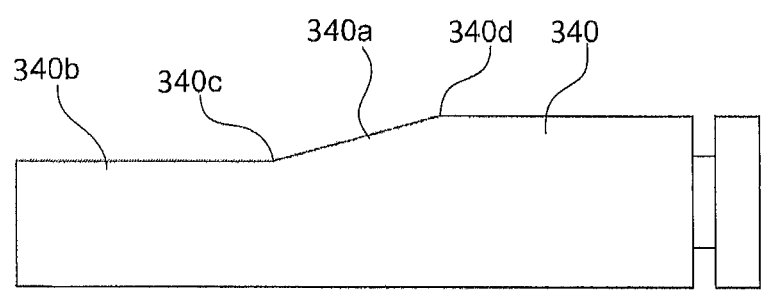
FIG. 22 shows the mandrel used for fabricating the movable hood.

The hood portion having such an oblique end can be readily fabricated during forming of the tube. A method of fabricating the hood portion 315A of the embodiment will now be described. FIG. 22 shows a mandrel 340 used for forming the hood portion 315A having a tubular shape.

On the surface of the mandrel 340 may be formed a protrusion 340a and a cylindrical portion 340b so as to conform to the shape of the hood portion 315A. That is, the cylindrical portion 340b may have a circular section and may be included in the cylindrical portion 315b of the hood portion 315A. The protrusion 340a may have a slope gradually rising forward from a circumferential part of the end 340c of the cylindrical portion 340b (a predetermined arcuate range corresponding to the reel leg to be inserted) (the slope end 340d may correspond to the opening 315c of the protrusion 315a of the hood portion 315A); and the slope may be included in the protrusion 315a of the hood portion 315A.

In the embodiment, the hood portion may be formed by rolling, around the mandrel 340 described above, a fiber reinforced resin tape 350 including the reinforcement fibers 350A arranged regularly in one orientation (in the direction of drawing the tape). The fiber reinforced resin tape 350 may have a width of 1 to 10 mm; and such a fiber reinforced resin tape 350 rolled around a bobbin 352 may be drawn out and rolled around a predetermined portion of the mandrel 340 to form an oblique fiber layer 350B (see FIG. 24). In forming the oblique fiber layer 350B, the fiber reinforced resin tape 350 drawn out from the bobbin 352 may be controlled to be oblique with respect to the axial direction of the mandrel 350 (the direction X shown in FIGS. 23a and 23b) so as to form the oblique end 315h. During rolling of the fiber reinforced resin tape 350, the reinforcement fibers may be oriented along the direction of the oblique end 315h such that no fibers in the oblique end 315h will be cut.

More specifically, the mandrel 340 may be rotated about the axial direction (the direction X in FIGS. 23a and 23b) by a drive mechanism and a control device not shown, and the bobbin 352 may be driven in the direction X while releasing the fiber reinforced resin tape 350. While being driven in the direction X, the bobbin 352 may additionally be driven so as to move rotationally in the directions D1, D2 as shown. That is, when the mandrel 340 is rotated and the bobbin 352 is moved in the direction X, the fiber reinforced resin tape 350 may be rolled around a desired portion of the mandrel 340 (to form the fiber reinforced resin layer 350B shown in FIG. 24).

Figure 23A:
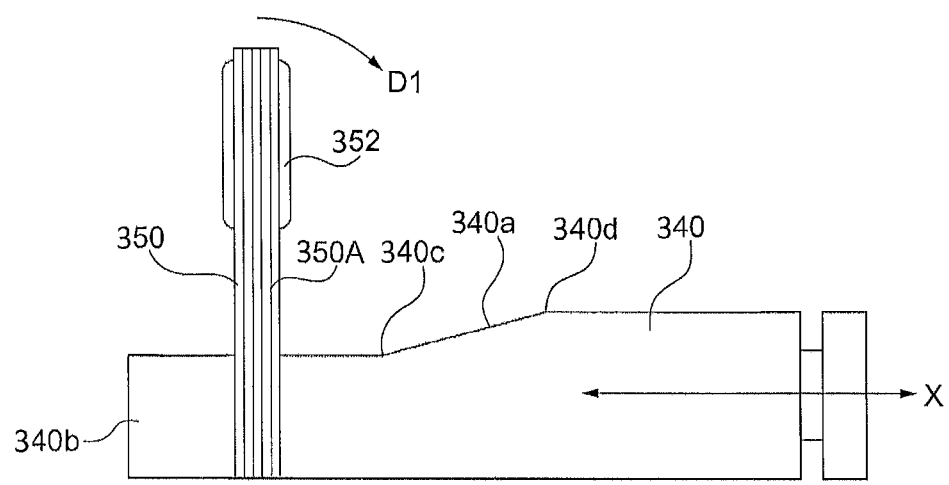

In this arrangement, the mandrel 340 and the bobbin 352 may first be positioned as shown in FIG. 23a wherein the bobbin 352 may release the fiber reinforced resin tape orthogonally to the direction X such that the fiber reinforced resin tape 350 may be orthogonally rolled around the cylindrical portion 340b of the mandrel (in the butt end side of the hood portion, the bobbin 352 may be positioned at a vertical position from which the fiber reinforced resin tape may be released orthogonally to the axial direction of the mandrel).

Figure 23B:
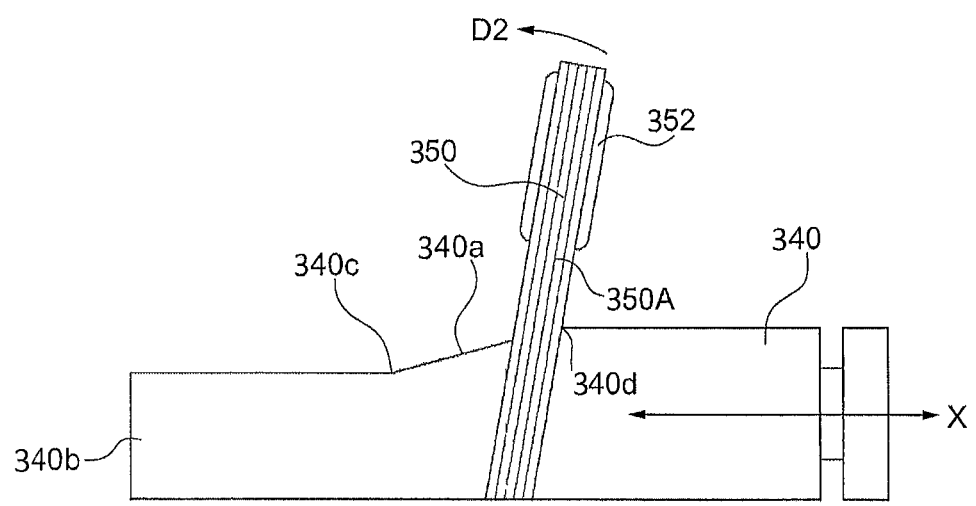

Then, the bobbin 352 may release the fiber reinforced resin tape while being moved in the direction X, and the mandrel 340 may be rotated, thereby to form the cylindrical portion 315b and the protrusion 315a of the hood portion 315A. When the fiber reinforced resin tape reaches the slope end 340d (corresponding to the opening 315c in the protrusion 315a of the hood portion 315A), the bobbin 352 may be rotationally moved in the directions D1, D2 in synchronization with the rotation of the mandrel 340. When the bobbin 352 is rotationally moved from the position shown in FIG. 23a in the direction D1, the oblique end closer to the viewer in the figure may be formed, and when the bobbin 352 is rotationally moved from the position shown in FIG. 23b in the direction D2, the oblique end farther to the viewer in the figure may be formed. More specifically, the bobbin 352 may be rotationally moved in the directions D1 and D2 so as to alternate on each 180° rotation of the mandrel, thereby to roll the fiber reinforced resin tape 350 along the oblique ends on both sides of the hood portion. For example, the oblique end 315h (see FIG. 24) may be formed when the fiber reinforced resin tape 350 is obliquely positioned as in FIG. 23b, and then the bobbin 352 may be rotationally moved in the direction D2 to the same oblique angle as shown in FIG. 23b, before the mandrel 340 may be rotated by 180° to form the oblique end on the opposite side (the back side in the figure). That is, on the opening side of the hood portion, the reinforcement fibers 350A can be oriented along the oblique ends by rotationally moving the bobbin to oblique positions from which the fiber reinforced resin tape is released obliquely to the axial direction of the mandrel 340 (the direction X) (in the opening side of the hood portion, the bobbin 352 may be rotationally moved to oblique positions from which the fiber reinforced resin tape is released obliquely to the axial direction of the mandrel).

Figure 24:
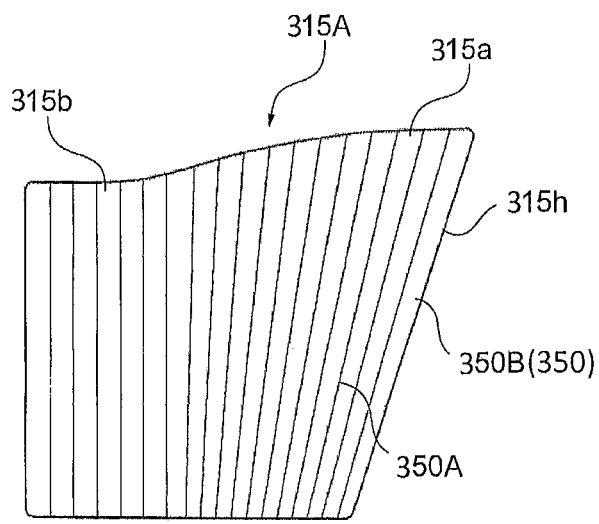
FIG. 24 shows the arrangement of the reinforcement fibers included in the movable hood formed by the fabrication method shown in FIGS. 23a and 23b.
Figure 25:
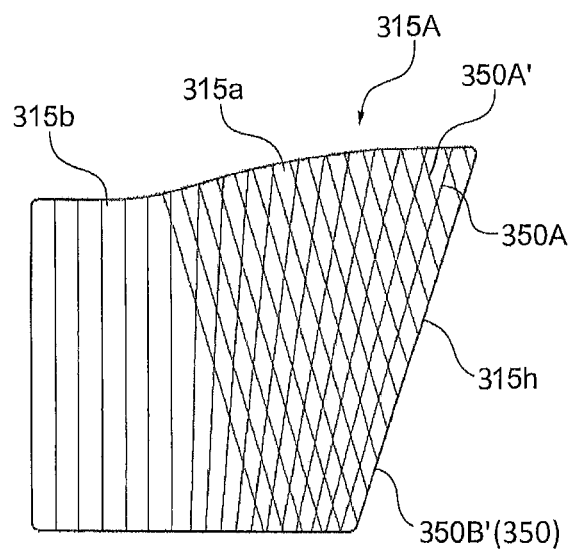
FIG. 25 shows an exemplary variation of the movable hood formed by the fabrication method shown in FIGS. 23a and 23b, showing the arrangement of the reinforcement fibers.

As shown in FIG. 24, the fiber reinforced resin tape 350 may be rolled around the protrusion 340a of the mandrel such that the oblique angle is gradually larger toward the slope end 340d. In this case, the bobbin 352 may be rotationally moved in the directions D1, D2 so as to alternate on each 180° rotation of the mandrel, and the angles of the rotational movement may be gradually larger toward the slope end 340d.

In the above fabrication method, the fiber reinforced resin tape 350 may be rolled around the mandrel 340 to form the cylindrical portion 315b and the protrusion 315a such that the reinforcement fibers in the oblique end 315h may be oriented along the oblique end 315h (see FIG. 24). That is, the oblique end 315h may be formed simultaneously with the hood portion 315A, and the oblique end 315h may readily formed of the fiber reinforced resin layer (circumferential fiber layer) 350B including the reinforcement fibers continuous circumferentially.

In the above arrangement, the bobbin 352 may be rotationally moved in the directions D1, D2 shown in FIGS. 23a and 23b (in the direction along the tape surface); alternatively, the bobbin 352 may also be rotationally moved orthogonally to the tape surface to form the oblique end. The mandrel 340 having the fiber reinforced resin tape 350 rolled therearound as described above may be heated to cure the synthetic resin, and then the mandrel 340 may be pulled out to leave the hood portion 315A as shown in FIG. 24.

In the above arrangement, the oblique end 315h may be formed by rotationally moving the bobbin 352 in the region of the slope end 340d of the mandrel 340; alternatively, the oblique end 315h may also be formed by accelerating the movement of the bobbin in the direction X in the region of the slope end 340d (in the opening side of the hood portion) while keeping the bobbin in the vertical position shown in FIG. 23a. That is, as the movement of the bobbin 352 is accelerated, the fiber reinforced resin tape 350 may be rolled around the mandrel 340 obliquely along the oblique end 315h. Thus, in the region of the slope end 340d of the mandrel 340 (the opening region), the oblique end can be formed on both sides of the opening by accelerating the movement of the bobbin 352 in the direction X and the reverse movement of the bobbin 352 in the direction X after the mandrel 340 is rotated by 180°. In such a driving method, the fabrication device can be simplified because there is no need of rotationally moving the bobbin 352 in the directions D1, D2.

In the above fabrication method, the bobbin 352 may be first moved to the slope end 340d and then reversely driven to a predetermined position. More specifically, in the arrangement shown in FIGS. 23a and 23b, the bobbin 352 may be reversely moved from the position shown in FIG. 23b to the predetermined position (the position where the protrusion 315a is formed) in the direction X while being rotationally moved such that the fiber reinforced resin tape is rolled at opposite oblique angles alternately for each 180° rotation of the mandrel. Thus, the fiber reinforced resin layer 350B' That is, since the reinforcement fibers 350A in the fiber reinforced resin tape 350 released and rolled may be oriented as indicated by the numeral 350A', the fiber reinforced resin layer 350W formed in the protrusion 315a may include the reinforcement fibers crossing each other. Thus, the hood portion may have an improved strength at the portion where a large load may be imparted from the reel leg. In the arrangement where the bobbin 352 is not rotationally moved, it may also be possible to accelerate the reverse movement of the bobbin 352 in the region of the protrusion 315a such that the fiber reinforced resin tape is rolled at an opposite oblique angle.

In the above fabrication method, the bobbin 352 may be driven in the direction X; alternatively, the mandrel 340 may be driven along the direction X instead of the bobbin 352. Further, in the above fabrication method, a prepreg sheet (such as a prepreg sheet including the reinforcement fibers arranged regularly in the axial direction or in an oblique direction) may be rolled on the fiber reinforced resin tape 350 rolled.

Figure 26:
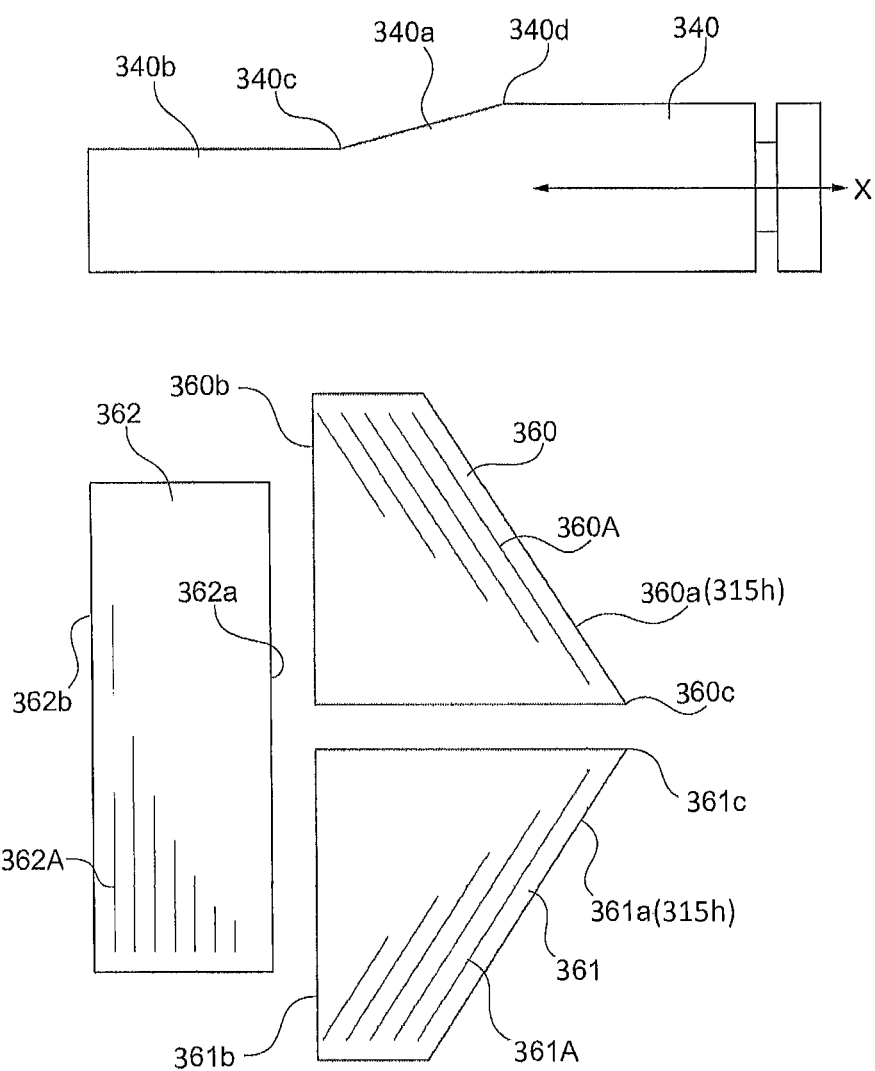
FIG. 26 explains another method of fabricating the movable hood, showing an exemplary arrangement of prepreg sheets.

FIG. 26 explains another method of fabricating the hood portion 315A including the oblique end 315h, showing an exemplary arrangement of prepreg sheets. In the fabrication method in the embodiment, the hood portion may be formed by rolling, on the mandrel 340 as described above, a plurality of prepreg sheets 360 to 362 having different specifications, heating the prepreg sheets to cure the synthetic resin, and then pulling out the mandrel 340.

The two prepreg sheets 360, 361 shown may include the reinforcement fibers 360A, 361A, respectively, arranged regularly along the oblique end 315h. These two separate prepreg sheets may be shaped such that one is rolled on one side of the mandrel to form a half ply and the other is rolled on the other side to form a half ply. These two sides may be divided at the top line of the opening 315c of the hood portion 315A (the line passing through the top of the opening in the direction X). That is, the prepreg sheets 360, 361 may border or overlap each other on the region of the protrusion 340a of the mandrel 340 (the region from the end 340c of the cylindrical portion 340b to the slope end 340d) such that each of the prepreg sheets may be rolled to form a half ply. The prepreg sheets 360, 361 may constitute the oblique fiber layer, and the oblique front ends 360a, 361a may constitute the oblique front end 315h of the hood portion 315A.

In rolling the prepreg sheets, the angle 360c of the oblique front end 360a of the prepreg sheet 360 may be positioned at the slope end 340d of the mandrel 340, and the rear end 360b may be positioned at the end 340c of the mandrel 340, while the angle 361c of the oblique front end 361a of the prepreg sheet 361 may be positioned at the slope end 340d of the mandrel 340, and the rear end 360b may be positioned at the end 340c of the mandrel 340.

The prepreg sheet 362 may include the reinforcement fibers 362A arranged regularly in the circumferential direction and may be shaped to form the cylindrical portion 315b of the hood portion 315A. That is, the prepreg sheet 362 may be shaped such that the front end 362a may be positioned at the end 340c of the mandrel 340, so as to form one or more plies at the front end 362a and one or more plies at the rear end 362b.

Thus, the hood portion 315A including the oblique end 315h may be readily fabricated by rolling the prepreg sheets 360, 361 on the mandrel 340. In this arrangement, additional prepreg sheets including the reinforcement fibers arranged regularly in the axial direction or in an oblique direction may be rolled on the above prepreg sheets.

Figure 27:
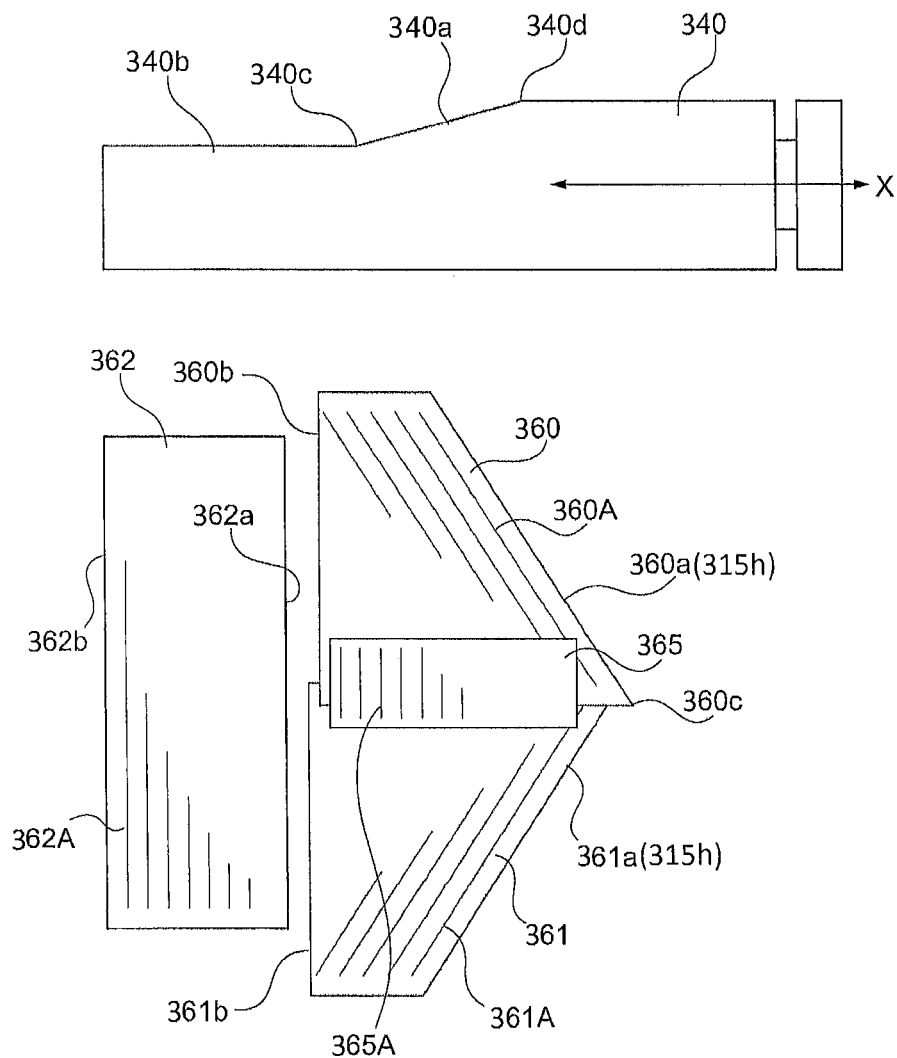
FIG. 27 shows an exemplary variation of the fabrication method shown in FIG. 26.

In rolling the prepreg sheets 360 to 362, it may be preferable that as shown in FIG. 27b, a reinforcement prepreg sheet 365 is disposed on the portion where the prepreg sheets 360, 361 border (or overlap) each other. Since the reinforcement prepreg sheet 365 is disposed on the portion where the reel leg is inserted, the reinforcement prepreg sheet 365 may preferably include the reinforcement fibers 365A arranged regularly in the circumferential direction. Such a reinforcement prepreg sheet may effectively reinforce the top region of the protrusion that may be prone to cracking.

Figure 28:
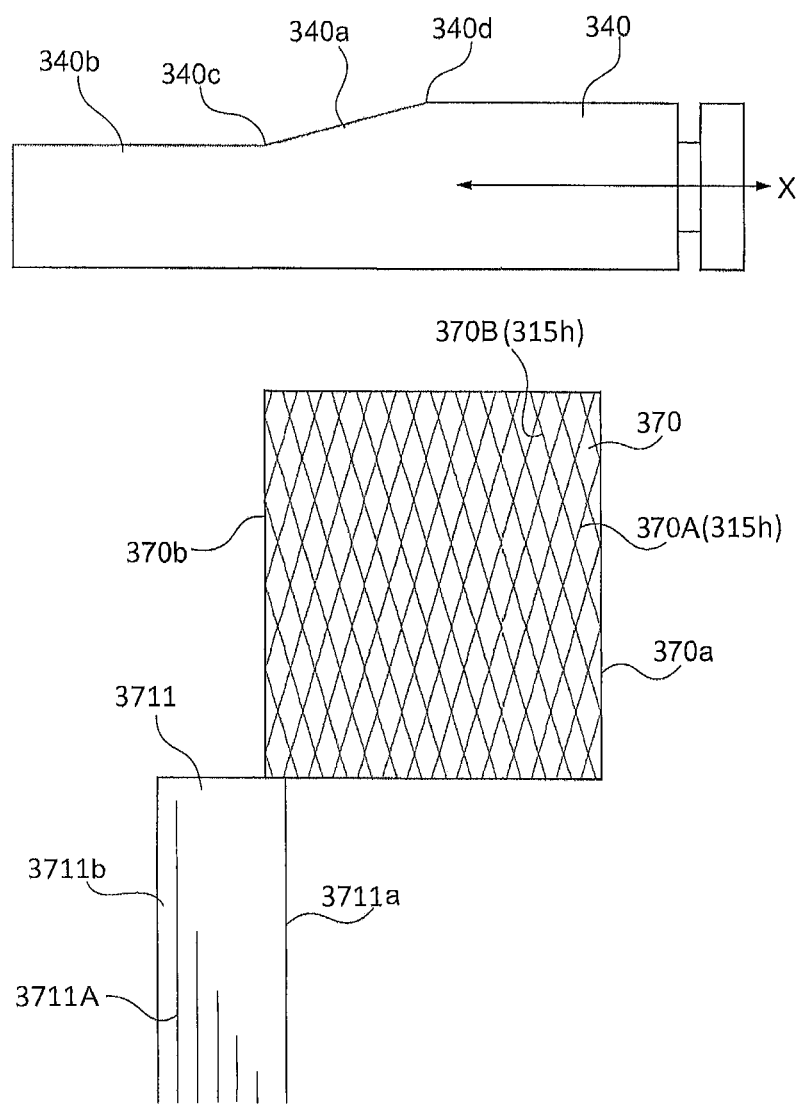
FIG. 28 explains another method of fabricating the movable hood, showing an exemplary arrangement of prepreg sheets.

FIG. 28 explains still another method of fabricating the hood portion 315A including the oblique end 315h, showing an exemplary arrangement of prepreg sheets. In the fabrication method in the embodiment, the hood portion may be formed by rolling, on the mandrel 340 as described above, the prepreg sheets 370, 371 having different specifications, heating the prepreg sheets to cure the synthetic resin, and then pulling out the mandrel 340.

The prepreg sheet 370 shown may include the reinforcement fibers 370A, 370B oriented obliquely to the axial direction of the mandrel 340 (the direction X) and may constitute the oblique fiber layer, wherein when the prepreg sheet 370 is rolled around the mandrel 340, the reinforcement fibers 370A, 370B crossing each other may be oriented along the oblique end 315h on both sides of the mandrel 340 extending from the top of the opening 315c of the hood portion 315A. The prepreg sheet 370 may be shaped such that the rear end 370b is positioned at the end 340c of the mandrel 340 to form one or more plies and the front end 370a is positioned ahead of the slope end 340d of the mandrel 340 to form one or more plies.

The prepreg sheet 3711 may include the reinforcement fibers 3711A arranged regularly in the circumferential direction and may be shaped to form the cylindrical portion 315b of the hood portion 315A. That is, the prepreg sheet 3711 may be shaped such that the front end 3711a may be positioned at the end 340c of the mandrel 340, so as to form one or more plies at the front end 3711a and one or more plies at the rear end 3711b.

Figure 29:
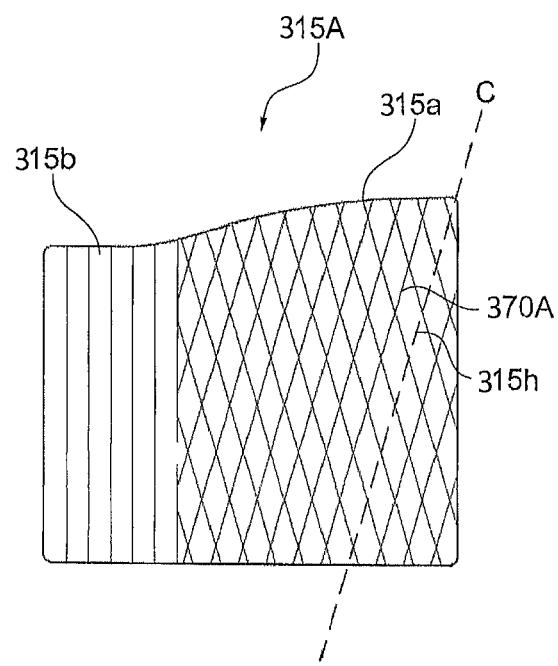
FIG. 29 shows a cut line in the tubular movable hood formed by the fabrication method shown in FIG. 28.

The prepreg sheets 370, 3711 may be rolled around the mandrel 340 and heated, and the mandrel 340 may be pulled out. Then, as shown in FIG. 29, the prepreg sheet 370 may be cut along the reinforcement fibers 370A, 370B (as denoted by the cut line C also passing along the reinforcement fiber 370B on the back side of the figure). Thus, the hood portion 315A can be fabricated wherein the reinforcement fibers may be oriented along the oblique end 315h.

Thus, the hood portion 315A including the oblique end 315h may be readily fabricated by rolling one prepreg sheet including the reinforcement fibers arranged obliquely on the mandrel 340.

In the reel leg fixing apparatus including the hood portion 315A having the oblique end described above, the hood portion 315A having a tubular shape may be formed of a fiber reinforced resin material and thus have a reduced weight. Additionally, forming the oblique end may further reduce the weight and enhance the appearance and grip feeling. Along the oblique end 315h may extend reinforcement fibers so as to be continuous circumferentially; therefore, the oblique end 315h may not undergo cracking or breakage even under a load to expand the opening in the circumferential direction caused by the reel leg inserted, thus effectively increasing the strength.

The present invention as described above is characterized in that the hood portion of the reel leg fixing apparatus may be formed of the fiber reinforced resin material so as to have an oblique fiber layer including the reinforcement fibers oriented along the oblique end of the hood portion. Thus, the prepreg sheets forming the hood portion may be susceptible to various modifications in characteristics such as the type, elasticity, resin content, and thickness of the reinforcement fibers and the condition of stacking. The oblique fiber layer included in the hood portion in the above embodiments may be replaced with, for example, a fiber layer including the reinforcement fibers oriented in the axial direction, a fiber layer including the reinforcement fibers oriented obliquely at a predetermined angle with respect to the axial direction, or a woven fabric layer including the reinforcement fibers oriented in two or more directions. Such a fiber layer may increase the strength against twisting in the protrusion 315a and the cylindrical portion 315b and allow efficient fabrication of the hood portion having a reduced weight and excellent strength.

The hood portion 315A of the reel leg fixing apparatus may include the protrusion 315a; but it may also be possible that the hood portion does not include the protrusion. For example, the hood portion of the movable hood 315 may be constituted by the cylindrical portion 315b having the same outer diameter as the operation nut 318 but may not include the protrusion, and the cylindrical portion 315b may have the opening 315c for receiving the reel leg. In this arrangement, the pad member 316 attached on the inner surface of the hood portion 315A may be made slightly thinner than in FIG. 20 so as to form the inner surface conforming to the reel leg inserted. Such a hood portion may allow the mandrel for forming the hood portion to have a cylindrical shape and facilitate rolling of the prepreg sheets as described above.

The above arrangement may also be applied to the hood portion 313A of the fixed hood 313. Further, the hood portion formed as described above may be coated for improving the appearance or protecting the surface or treated with vapor deposition of a metal or ceramic.

Embodiments of the present invention are not limited to the above descriptions and are susceptible to various modifications.

What is claimed is:

1. A reel leg fixing apparatus comprising:
 a hood portion having a tubular shape and including a protrusion protruding so as to have an opening for receiving a reel leg of a fishing reel,
 wherein the hood portion is formed of a plurality of prepreg sheets stacked together and is configured to be moved in an axial direction by an operation nut, and
 the hood portion includes reinforcement fibers oriented at least in the axial direction and extending continuously across an entire length of the axial direction of the hood portion, the reinforcement fibers having first portions oriented parallel to the axial direction, and the protrusion, when seen in the axial direction of the hood portion, is a region where the reinforcement fibers oriented at least in the axial direction have second portions extending respectively from the first portions that are oriented oblique to the axial direction.

2. The reel leg fixing apparatus of claim 1, wherein the second portions of the reinforcement fibers oriented at least in the axial direction are oriented oblique to the axial direction symmetrically on both left and right sides of the hood portion.

3. The reel leg fixing apparatus of claim 1, wherein the region is disposed near the opening of the hood portion.

4. The reel leg fixing apparatus of claim 1, wherein an axial fiber layer including the reinforcement fibers oriented in at least the axial direction is disposed in an outer layer of the hood portion.

5. The reel leg fixing apparatus of claim 1, wherein the second portions of the reinforcement fibers in the region are oblique to the axial direction at an angle of 5° or larger.

* * * * *